(12) United States Patent
Wada et al.

(10) Patent No.: US 7,317,538 B2
(45) Date of Patent: Jan. 8, 2008

(54) OPTICAL TWO-DIMENSIONAL VELOCITY AND/OR MOVEMENT DETECTOR

(75) Inventors: Hideo Wada, Katsuragi (JP); Nobuhisa Watanabe, Katsuragi (JP); Takayuki Taminaga, Kitakatsuragi (JP)

(73) Assignee: Sharp Kabushiki Kaisha, Osaka (JP)

( * ) Notice: Subject to any disclaimer, the term of this patent is extended or adjusted under 35 U.S.C. 154(b) by 235 days.

(21) Appl. No.: 11/028,610

(22) Filed: Jan. 5, 2005

(65) Prior Publication Data
US 2005/0146707 A1 Jul. 7, 2005

(30) Foreign Application Priority Data
Jan. 7, 2004 (JP) ............................ P2004-002158

(51) Int. Cl.
*G01B 11/14* (2006.01)
(52) U.S. Cl. ...................................... 356/486; 356/28.5
(58) Field of Classification Search ............... 356/28.5, 356/485, 486, 492, 493, 496, 498
See application file for complete search history.

(56) References Cited

U.S. PATENT DOCUMENTS

| | | | | |
|---|---|---|---|---|
| 3,723,004 | A | * | 3/1973 | Brayton ......................... 356/28 |
| 3,860,342 | A | * | 1/1975 | Orloff et al. .................... 356/28 |
| 4,872,751 | A | * | 10/1989 | Hercher ....................... 356/35.5 |
| 4,997,272 | A | * | 3/1991 | Dopheide et al. ........... 356/28.5 |
| 5,526,109 | A | * | 6/1996 | Johnson ..................... 356/28.5 |

FOREIGN PATENT DOCUMENTS

| | | |
|---|---|---|
| JP | 59-000674 | 1/1984 |
| JP | 61-065116 | 4/1986 |
| JP | 62-043569 | 2/1987 |
| JP | 3-235060 | 10/1991 |
| JP | 04-027869 | 1/1992 |
| JP | 4-204104 | 7/1992 |
| JP | 06-160117 | 6/1994 |
| JP | 8-15435 | 1/1996 |
| JP | 08-114673 | 5/1996 |
| JP | 2002-054987 | 2/2002 |

OTHER PUBLICATIONS

Applied Physics Letters, vol. 4, No. 10, May 15, 2064, pp. 176-178.

* cited by examiner

*Primary Examiner*—Samuel A. Turner
(74) *Attorney, Agent, or Firm*—Nixon & Vanderhye, PC

(57) ABSTRACT

In an optical movement information detector, light emitted from a laser diode (1) is split into a first beam (10), a second beam (11) and a third beam (12) by beam splitters (2a, 2b). The first, second and third beams are converged by a condenser lens (4) upon a surface of an object to be measured (5) to form a beam spot (13) thereon. Diffused light from the beam spot (13) is received by a photodiode (6) and an output signal of the photodiode (6) is processed by a signal processing circuit (20) including an analog-digital converter (8) and a Fourier transforming unit (9). A detecting section (21) obtains, for example, a moving velocity and a moving direction of the object based on spectrum peak frequencies obtained by the Fourier transform.

25 Claims, 14 Drawing Sheets

OPTICAL TWO-DIMENSIONAL VELOCITY AND/OR MOVEMENT DETECTOR

This Nonprovisional application claims priority under 35 U.S.C. §119(a) on Patent Application No. 2004-002158 filed in Japan on Jan. 7, 2004, the entire contents of which are hereby incorporated by reference.

BACKGROUND OF THE INVENTION

The present invention relates to an optical movement information detector and electronic equipment having the same.

As a general rule, when a light source and an observer move relative to each other, light is subjected to frequency changes by the Doppler effect. The laser Doppler velocimeter (hereinafter, referred to as LDV) uses this effect to measure the moving velocity of an object to be measured by applying laser light onto the object and measuring Doppler frequency shifts in the scattered light derived from the object. This LDV, which was released by Yeh and Cummins in 1964 (Appl. Phys. Lett. 4-10 (1964) 176), is widely known and is in practical use today.

FIG. 12 shows an optical system diagram of a typical conventional LDV.

In FIG. 12, 101 denotes a laser diode (hereinafter, referred to as LD) as a semiconductor laser, 102 denotes a photodiode as a light detecting device (hereinafter, referred to as PD), 103 denotes a diffraction grating, 104 denotes a collimator lens (hereinafter, referred to as CL), 105 denotes a mirror, 106 denotes a condenser lens, 107 denotes a first luminous flux, or beam of positive first order diffracted light by the diffraction grating 103, 108 denotes a second beam of negative first order diffracted light by the diffraction grating 103, and 113 denotes an object to be measured.

In the optical system as constituted above, laser light emitted from the LD 101 is converted by the CL 104 into a parallel beam, and then is split into positive and negative first order diffracted lights at a diffraction angle of θ by the diffraction grating 103 to become the first beam 107 and the second beam 108. The first beam 107 and the second beam 108 are respectively reflected by the mirror 105 and are then made incident on the surface of the object 113 at an incident angle of θ to be overlapped each other again. The first beam 107 and the second beam 108 scattered by the object 113, which have been Doppler frequency-shifted, are slightly different from the LD 101 in oscillating frequency. As a result, the interferential waves of the first beam 107 and the second beam 108 scattered by the object 113 generate beat. This beat is termed beat signal. The moving velocity of the object 113 is obtained by heterodyne-detecting the beat frequency of the beat signal using the PD 102. Hereinafter, this typical conventional LDV will be described in further detail.

Here, when the direction in which the object 113 moves to the right, as shown in FIG. 15 is set as the normal direction, the first beam 107 is Doppler frequency-shifted by $-f_d$ and the second beam 108 is Doppler frequency-shifted by $+f_d$, so that the apparent frequency of the first beam 107 becomes $(f_0-f_d)$ and the apparent frequency of the second beam 108 becomes $(f_0+f_d)$. Note that $f_0$ represents the oscillating frequency of the LD 101. In this case, since an electric field of the light emitted from the LD 101 is represented as $E_0 \cdot \cos(2\pi f_0 t)$, the first beam 107 is indicated by Equation (1) below and the second beam 108 by Equation (2) below:

$$I_A = E_A \cdot \cos\{2\pi(f_0-f_d)t + \phi_A\} \quad (1)$$

$$I_B = E_B \cdot \cos\{2\pi(f_0+f_d)t + \phi_B\} \quad (2)$$

where $f_0$ denotes a frequency of outgoing beam from the LD 101, $E_0$ denotes an amplitude of the outgoing beam from the LD 101, $E_A$ denotes an amplitude of the first beam 107, $E_B$ denotes an amplitude of the second beam 108, $\phi_A$ denotes a phase of the first beam 107 and $\phi_B$ denotes a phase of the second beam 108.

Since the frequency of light is generally 100 THz ($10^{14}$ Hz), it is impossible to measure the frequency information of Equation (1) and Equation (2) directly. Therefore, heterodyne detection is generally employed for direct measurement as mentioned above, and because $f_0 \gg f_d$ is established, the interferential waves of Equation (1) and Equation (2) can be described by the following expression:

$$\langle |I_A + I_B|^2 \rangle = \frac{E_A^2 + E_B^2}{2} + E_A \cdot E_B \cdot \cos\{2\pi(2f_d)t - (\phi_A - \phi_B)\} \quad (3)$$

Note that < > in the left side of Equation (3) represents time average. Consequently, the PD 102 allows the frequencies of these interferential waves to be measured.

FIG. 13 shows a case in which the object 113 moves at a velocity of V, two beams are made incident on the object 113 at arbitrary angles of α and β respectively, and the observation point receives scattered light at an arbitrary angle of γ.

Frequency shift quantity due to the Doppler effect, which is obtained using the Lorentz transformation based on relativism in a precise sense, may be approximately obtained as follows when the moving velocity V is sufficiently smaller than velocity of light c. Relative velocities $V_{A1}$ and $V_{B1}$ of light from a light source A and a light source B and a moving object are expressed by the following equations:

$$V_{A1} = c - V \sin \alpha$$

$$V_{B1} = c + V \sin \beta \quad (4)$$

Also, apparent frequencies $f_{A1}$ and $f_{B1}$ of lights as seen from the object 113 are expressed by the following equations:

$$f_{A1} = \frac{V_{A1}}{\lambda} = \frac{1}{\lambda} \cdot (c - V\sin\alpha) \quad (5)$$

$$f_{B1} = \frac{V_{B1}}{\lambda} = \frac{1}{\lambda} \cdot (c + V\sin\beta)$$

Relative velocities $V_{A2}$ and $V_{B2}$ of scattered (reflected) lights relative to the object 113 are expressed by the following equations:

$$V_{A2} = c - V \sin \gamma$$

$$V_{B2} = c - V \sin \gamma \quad (6)$$

Consequently, frequencies $f_{A2}$ and $f_{B2}$ of the lights as seen from the observation point are expressed by the following equations:

$$f_{A2} = \frac{c}{V_{A2}} \cdot f_{A1} = \frac{c}{\lambda} \cdot \frac{1 - \frac{V}{c} \cdot \sin\alpha}{1 - \frac{V}{c} \cdot \sin\gamma} \quad (7)$$

$$f_{B2} = \frac{c}{V_{B2}} \cdot f_{B1} = \frac{c}{\lambda} \cdot \frac{1 + \frac{V}{c} \cdot \sin\beta}{1 - \frac{V}{c} \cdot \sin\gamma}$$

The difference between the frequency in Equation (7) and the frequency $f_0$ (=c/λ) of incident light is a Doppler frequency shift quantity $f_d$. Here, the beat frequency of the two beams measured at the observation point $2f_d$ is expressed by the following equation using c>>V:

$$2f_d = |f_{B2} - f_{A1}| \quad (8)$$

$$= \frac{V}{\lambda} \cdot (\sin\alpha + \sin\beta)$$

It can be seen that $2f_d$ is independent of a position of the observation point (angle: γ). In FIG. 12, in which α=β=θ is valid, the following expression is established based on Equation (8) according to the typical optical system of the LDV of FIG. 12:

$$2f_d = \frac{2V}{\lambda} \cdot \sin\theta \quad (9)$$

Consequently, the moving velocity V of the object 113 is obtained by measuring frequency $2f_d$ indicated in Equation (3) and performing calculation using Equation (9).

Equation (9) may be geometrically interpreted as follows: FIG. 14 is an enlarged view of an area in which the two beams in FIG. 12 (the first beam 107 and the second beam 108) overlap each other again. The two beams intersect at incident angles of θ respectively, and the broken lines in FIG. 14 show parts of the equal wave fronts of the beams. An interval between the broken lines shows the wavelength λ of light. The vertical heavy lines show the bright parts of interference fringes, and given that the interval between the vertical heavy lines is Δ, this Δ is obtained from Equation (10) below:

$$\Delta = \frac{\lambda}{2\sin\theta} \quad (10)$$

As shown in FIG. 14, when an object (shown as ●) passes perpendicularly to the interference fringes at a velocity of V, the frequency f is expressed by the following equation:

$$f = \frac{V}{\Delta} = \frac{2V}{\lambda} \cdot \sin\theta = 2f_d \quad (11)$$

This equation is equal to Equation (9).

The mentioned typical LDV can thus obtain the moving velocity V; however, the LDV cannot detect the moving direction of the object to be measured. In contrast, in JP 03-235060 A, detecting a moving direction is made possible by rotating the diffraction grating 103 in FIG. 12 at a velocity of $V_g$. As a result, when light is reflected by the diffraction grating 103, each of beams is subjected to the Doppler frequency shift in proportion to $V_g$. Accordingly, the beat frequency $2f_d$ to be measured in the PD 102 is indicated by the following equation:

$$2f_d = \frac{2V}{\lambda} \cdot (V + V_g) \cdot \sin\theta \quad (12)$$

Consequently, the moving direction is obtained since the magnitude of $2f_d$ is determined according to the positive or negative sign of the moving velocity V relative to a given velocity of $V_g$. According to the abovementioned optical system, however, a rotating mechanism of the diffraction grating 103 is required with result that the device becomes larger in size and higher in cost. In addition, in the optical system, the rotational velocity of the diffraction grating 103, which needs to be precisely maintained, is difficult to maintain due to factors such as errors caused by eccentricity, vibration caused by rotation, etc. Thus, the optical system is difficult to employ for precise measurement.

A velocimeter which solves the above problems is disclosed in JP 04-204104 A. The velocimeter uses a frequency shifter to change the frequency of an incident beam, which allows detection of the moving direction of an object to be measured.

FIG. 15 shows a schematic diagram of an optical system of the velocimeter.

According to the velocimeter, light emitted from a laser source 1 become a parallel beam by a CL 104, and then are split into two beams by a beam splitter (hereinafter, referred to as BS) 109. The beams are reflected by a mirror 105 and are then frequency-shifted by $f_1$ and $f_2$, respectively, by an acousto-optic modulator (hereinafter, referred to as AOM) 110. The light is again collected on the surface of an object to be measured 113 by a diffraction grating 103 so as for the beat frequency of scattered light from the object to be measured 113 to be detected using a PD 102. The frequency $2f_d$ to be detected here is expressed by the following equation:

$$2f_d = (|f_1 - f_2|) + \frac{2V}{\lambda} \cdot \sin\theta \quad (13)$$

Since the sign (plus or minus) of V changes according to the moving direction of the object 113, the moving direction of the object 113 is detected by the magnitude relationship of $2f_d$ relative to a given frequency shift quantity $|f_1-f_2|$.

Also in JP 08-15435 A, frequency is changed using an electro-optical device (hereinafter, referred to as EOM) 111 shown in FIG. 16 based on the principle similar to the principle employed in JP 04-204104 A. More specifically, light emitted from an LD 101, which is a laser source, becomes a parallel beam by a CL 104, and is then split into two beams, a first beam 107 and a second beam 108, by a diffraction grating 103. The first beam 107 and the second beam 108 enter corresponding EOMs 111. Here, bias is applied to the second beam 108 to shift its frequency by $f_R$. The first beam 107 and the second beam 108 are reflected by a mirror 105, and then are collected on the surface of the object to be measured 113. The beat frequency of scattered light from the surface of the object 113 is detected using a PD 102. The frequency $2f_d$ detected here is expressed by the following equation:

$$2f_d = f_R + \frac{2V}{\lambda} \cdot \sin\theta \qquad (14)$$

Consequently, similarly to Equation (13), the moving direction of the object 113 is detected by the magnitude relation of $2f_d$ relative to a given frequency shift quantity $f_R$ since the sign of V changes according to the moving direction of the object.

However, an optical system where the moving direction of the object 113 is detected using frequency shifters such as the AOM 110 and the EOM 111, is disadvantageous in that the device is made larger in size since the optical system becomes more complex and facilities for driving the frequency shifters such as a power source are required. For example, voltage necessary for frequency modulation by the AOM 110 is of about tens of volts and voltage necessary for frequency modulation by the EOM 111 is of about 100 volts with the result that a large-sized power source is required.

Further, in order to detect a two-dimensional moving velocity (a velocity component in a direction parallel to an arrow and a velocity component in a direction vertical to the drawing sheet in FIG. 15 and FIG. 16) with use of the above-described optical system, two optical systems are necessary. More specifically, two optical systems have to be disposed in such a manner that the velocity component in one direction is detected by one optical system and the velocity component in a direction orthogonal to the one direction is detected by the other optical system. Further, since scattered light from each of beam spots formed for detecting the components in the two directions diffuses in a spherical form, the diffused light from one beam spot will act as noise to a light detecting device for detecting light from the other beam spot, which makes it necessary to provide a system for separating optical signals. This causes a problem that detecting the two-dimensional moving velocity would complicate the structure of the optical system.

SUMMARY OF THE INVENTION

An object of the present invention is to provide an optical movement information detector which is small in size and low in power consumption and which is capable of detecting two-dimensional moving velocity and moving direction with a simple structure, as well as electronic equipment having the same.

In order to accomplish the above object, an optical movement information detector according to a first aspect of the present invention has:

a semiconductor light-emitting device for emitting coherent light;

a first beam splitting device for splitting the light emitted from the semiconductor light-emitting device into at least three beams;

an optical system for forming one spot on a surface of an object to be measured with use of the beams;

a light detecting device for receiving diffused light coming from the spot;

a signal processing circuit for processing a signal outputted from the light detecting device; and a detecting section for obtaining movement information on the object based on an output from the signal processing circuit; wherein the signal processing circuit includes:

an analog-digital converting section for converting an analog signal outputted from the light detecting device to a digital signal; and a Fourier transforming section for performing Fourier transform upon the digital signal, and the detecting section obtains the moving information on the object based on a peak frequency in a spectrum obtained by the Fourier transforming section.

The optical movement information detector with the above arrangement splits light emitted from the semiconductor light-emitting device into at least three beams by the first beam splitting device. The optical system forms one spot on a surface of an object to be measured using the at least three beams. Diffused light coming from the spot is detected by the light detecting device and a signal outputted from the light detecting device is processed by the signal processing circuit. Specifically, in the signal processing circuit, the analog-digital converting section converts an analog signal outputted from the light detecting device to a digital signal, which is then subjected to Fourier transform in the Fourier transforming section. The detecting section obtains the moving information on the object, such as a moving velocity and a moving direction, based on a peak frequency in a spectrum obtained by the Fourier transform.

As is apparent from above, the optical movement information detector detects moving information on the object without rotating any of its component parts. Thus, a device for rotating the component parts is dispensed with, and downsizing is achieved accordingly. Moreover, since no device for rotating the component parts is used, power consumption can be kept low.

Further, least three beams derived from the light split by the first beam splitting device are used to form a spot on the surface of the object to be measured. Thus, based on the output from the light detecting device which received diffused light from the spot, a frequency shift corresponding to the moving direction of the object is detectable. Therefore, it becomes possible to detect two-dimensional moving velocity and moving direction with a simple structure.

In one embodiment, the first beam splitting device splits the light emitted from the semiconductor light-emitting device into three beams which are a first beam, a second beam and a third beam. And, a first plane including the first beam and the second beam is perpendicular to a second plane including the first beam and the third beam.

In one embodiment, the optical system includes a light condensing section for collecting the first beam, the second beam and the third beam into the spot. The first beam enters an original point that is a point of intersection of a third plane on which the light condensing section is disposed, the first plane and the second plane, the second beam enters a first incident point on an X axis that is a line of intersection of the third plane with the first plane, and the third beam enters a second incident point on a Y axis that is a line of intersection of the third plane with the second plane. Points of intersection of each of the first beam, the second beam and the third beam with the third plane form a right angled triangle. The right angled triangle is included in a first quadrant with respect to the X axis and Y axis, and the diffused light passes a third quadrant with respect to the X axis and the Y axis.

In one embodiment, a bisector of an angle formed by the X axis and the Y axis that extends from the first quadrant to the third quadrant intersects with an optical axis of the diffused light.

In one embodiment, the light condensing section includes a condenser lens.

In one embodiment, the Fourier transforming section obtains a first peak frequency, a second peak frequency lower than the first peak frequency, and a third peak frequency lower than the first and second peak frequencies, and the detecting section obtains a moving velocity of the object by calculating a sum of squares of the second peak frequency and the third frequency without using the first peak frequency.

In one embodiment, the Fourier transforming section obtains a first peak frequency, a second peak frequency lower than the first peak frequency, and a third peak frequency lower than the first and second peak frequencies, and the detecting section obtains a moving velocity of the object by calculating a sum of squares of the first peak frequency and the third frequency without using the second peak frequency.

In one embodiment, the Fourier transforming section obtains a first peak frequency and a second peak frequency lower than the first peak frequency, and the detecting section obtains a moving velocity of the object by using the second peak frequency without using the first peak frequency.

In one embodiment, the Fourier transforming section obtains first and second peak frequencies, and the detecting section obtains a moving direction of the object from a ratio between the first peak frequency and the second peak frequency.

In one embodiment, the first beam splitting device splits the light emitted from the semiconductor light-emitting device into three beams which are a first beam, a second beam and a third beam. The optical movement information detector further includes a wavelength plate that is disposed on an optical axis of the first beam and forms an angle of 45° with a polarization direction of the first beam. The optical system forms the one spot on the surface of the measuring object by using the first beam, the second beam and the third beam. The optical movement information detector also includes a second beam splitting device for splitting the diffused light coming from the spot into first and second light signals, a first linear polarizer disposed on an optical axis of the first light signal, and a second linear polarizer disposed on an axis of the second light signal and having an optical axis approximately orthogonal to an optical axis of the first linear polarizer. The light detecting device includes a first light detecting device for receiving the first light signal and a second light detecting device for receiving the second light signal. The detecting section obtains a moving velocity of the object based on at least either the peak frequency regarding the first light signal or the peak frequency regarding the second light signal, and a moving direction of the object based on a phase regarding the first light signal and a phase regarding the second light signal.

In one embodiment, the Fourier transforming section obtains a fourth peak frequency, a fifth peak frequency and a sixth peak frequency regarding the first light signal, and also obtains a seventh peak frequency, an eighth peak frequency and a ninth peak frequency regarding the second light signal. The detecting section obtains a moving direction of the object from a phase difference between a signal corresponding to the forth peak frequency and a signal corresponding to the seventh peak frequency, as well as a phase difference between a signal corresponding to the fifth peak frequency and a signal corresponding to the eighth peak frequency.

In one embodiment, the Fourier transforming section obtains real parts and imaginary parts for each of the fourth peak frequency, the fifth peak frequency, the seventh peak frequency and the eighth peak frequency. Phases of signals corresponding to each of the fourth peak frequency, the fifth peak frequency, the seventh peak frequency and the eighth peak frequency are obtained based on the real parts and the imaginary parts.

In one embodiment, the detecting section detects the moving direction of the object based on whether the phase difference is positive or negative.

In one embodiment, the detecting section determines that the measuring object is in resting state if a value of the phase difference is out of a specified range.

In one embodiment, the first beam splitting device splits the light emitted from the semiconductor light-emitting device into three beams which are a first beam, a second beam and a third beam. A first plane including the first beam and the second beam is perpendicular to a second plane including the first beam and the third beam. The optical system includes a light condensing section for collecting the first beam, the second beam and the third beam into the spot. The first beam enters an original point that is a point of intersection of a third plane on which the light condensing section is disposed, the first plane and the second plane, the second beam enters a first incident point on an X axis that is a line of intersection of the third plane with the first plane, and the third beam enters a second incident point on a Y axis that is a line of intersection of the third plane with the second plane. The diffused light includes a first light signal having an optical axis passing a point symmetrical about the original point to the first incident point, and a second light signal having an optical axis passing a point symmetrical about the original point to the second incident point. The light detecting device includes a first light detecting device for receiving the first light signal and a second light detecting device for receiving the second light signal.

In one embodiment, the Fourier transforming section obtains a plurality of peak frequencies regarding the first light signal and also obtains a plurality of peak frequencies regarding the second light signal. And, the detecting section obtains a moving velocity of the object by calculating a sum of squares of a maximum peak frequency among the plurality of peak frequencies regarding the first light signal and a maximum peak frequency among the plurality of peak frequencies regarding the second light signal.

In one embodiment, the detecting section detects a moving direction of the object from a ratio of the maximum peak frequency among the plurality of peak frequencies regarding the first light signal and the maximum peak frequency among the plurality of peak frequencies regarding the second light signal.

In one embodiment, the optical movement information detector further includes a third beam splitting device for splitting the first light signal into two light signals which are a third light signal and a fourth light signal, a fourth beam splitting device for splitting the second light signal into two light signals which are a fifth light signal and a sixth light signal, a third linear polarizer disposed on an optical axis of the third light signal, a fourth linear polarizer disposed on an optical axis of the fourth light signal and having an optical axis approximately orthogonal to an optical axis of the third linear polarizer, a fifth linear polarizer disposed on an optical axis of the fifth light signal, and a sixth linear polarizer disposed on an optical axis of the sixth light signal and having an optical axis approximately orthogonal to an optical axis of the fifth linear polarizer. The first light detecting device includes a third light detecting device for receiving the third light signal and a fourth light detecting device for receiving the fourth light signal, and the second light detecting device includes a fifth light detecting device for receiving the fifth light signal and a sixth light detecting device for receiving the sixth light signal.

In one embodiment, the detecting section determines that the object is in resting state if a value of peak intensity of the spectrum is equal to or lower than a specified threshold value.

In one embodiment, the detecting section determines that the object is in resting state if a count of events within a given sampling time that the digital signal has an output value equal to or larger than a threshold value (namely, the number of occurrences of a digital signal output value equal to or larger than the threshold value) is n (n: natural number excluding 0) or less.

In one embodiment, calculation by the Fourier transforming section starts when a count of events within a given sampling time that the digital signal has an output value equal to or larger than a threshold value exceeds n (n: natural number excluding 0).

In one embodiment, the detecting section determines that the object is in resting state if a value of a maximum peak intensity of the spectrum is equal to or lower than N (N: natural number excluding 0).

Electronic equipment according to a second aspect of the present invention includes the above-mentioned optical movement information detector.

The electronic equipment may be a pointing device. Also, the electronic equipment may be an encoder.

Other objects, features and advantages of the present invention will be apparent from the following description.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

Hereinbelow, an optical movement information detector of the present invention will be described in detail in conjunction with the embodiments with reference to the drawings.

Embodiment 1

Figure 1:
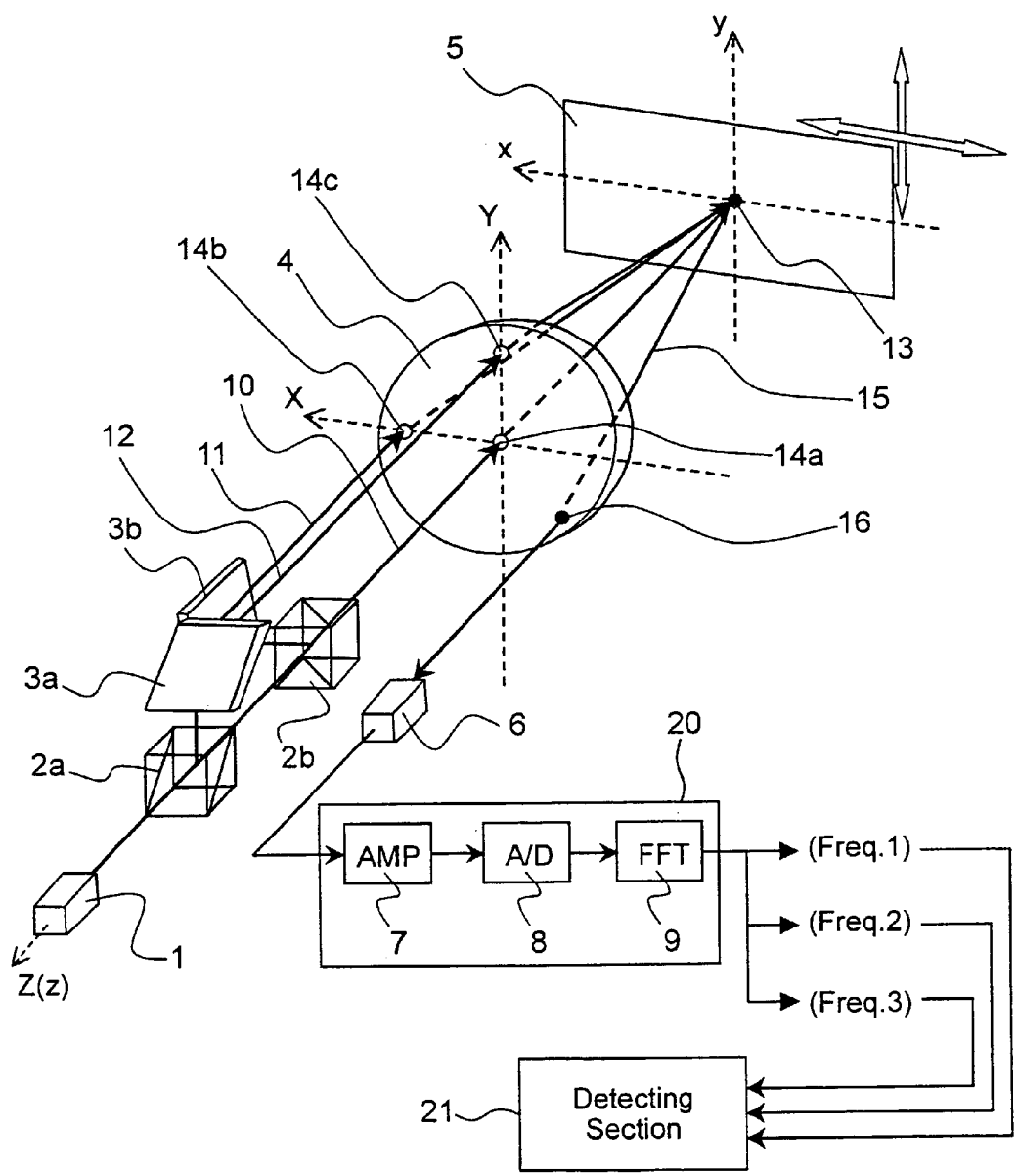
FIG. 1 is a schematic view showing the configuration of an LDV in Embodiment 1 of the present invention.

FIG. 1 is a schematic view showing the configuration of an LDV in Embodiment 1 of the present invention. In FIG. 1, only the main component parts such as optical components are illustrated and other components such as members for holding the optical components are omitted from FIG. 1. Arrowed broken lines represent coordinate axes in FIG. 1. It is to be noted that in FIG. 1, X axis and x axis are parallel, Y axis and y axis are parallel, and Z axis and z axis are identical.

The LDV includes an LD1 exemplifying the semiconductor light-emitting device, a first beam splitting device for splitting the light emitted from the LD1 into three beams, an optical system for guiding these three beams to the surface of an object 5 to be measured to form one beam spot 13, a PD 6 exemplifying the light detecting device for receiving diffused light 15 coming from the beam spot 13, a signal processing circuit 20 for processing a signal outputted from the PD 6, and a detecting section 21 for obtaining movement information on the object 5 based on an output from the signal processing circuit 20. It is to be noted that the LD1 is disposed at point $(0, 0, z_1)$. The object 5 moves at moving velocity V along an x-y plane including the x and y axes. In this case, the surface of the object 5 is on the x-y plane.

The first beam splitting device is composed of beam splitters (hereinbelow referred to as BSs) $2a$ and $2b$. The BS $2a$ splits the light emitted from the LD1 into a third beam 12 and another beam, whereas the BS $2b$ splits the latter beam into a first beam 10 and a second beam 11.

The optical system is composed of a mirror $3a$ for reflecting the third beam 12, a mirror $3b$ for reflecting the second beam 11, and a condenser lens 4 exemplifying the light condensing section for collecting the first beam 10, the second beam 11 and the third beam 12 onto the surface of the object 5. The condenser lens 4 is disposed so as to coincide with an X-Y plane including the X axis and the Y axis. Consequently, the condenser lens 4 includes at least two points on the X axis and at least two points on the Y axis. The X-Y plane constitutes an example of the third plane.

The signal processing circuit 20 is composed of an amplifier 7 for amplifying an analog signal outputted from the PD 6, an A/D (Analog/Digital) converter 8 exemplifying the analog-digital converting section for converting the analog signal of PD 6 amplified by the amplifier 7 to a digital signal, and an FFT (Fast Fourier Transform) computing unit 9 exemplifying the Fourier transforming section for Fourier transforming the digital signal outputted from the A/D converter 8.

According to the above-structured LDV, a beam emitted from the LD1 is first split by the BS 2*a* into a third beam 12 traveling in the positive Y axis direction and a beam aligned with Z axis. The beam aligned with the Z axis is then split by the BS 2*b* disposed on Z axis into a beam aligned with Z axis and a second beam 11 traveling in +X axis direction.

Next, the second beam 11 is reflected by the mirror 3*b* and its traveling direction is changed to be parallel to the first beam 10. The third beam is also reflected by the mirror 3*b* and its traveling direction is changed to be parallel to the first beam 10.

Next, the first beam 10, the second beam 11 and the third beam 12 enter the condenser lens 4. More specifically, the first beam 10 comes incident upon an original point 14*a* of the X-Y plane, the second beam 11 comes incident upon a first incident point 14*b* on the X axis, and the third beam 12 comes incident upon a second incident point 14*c* on the Y axis. In this case, the first and second incident points 14*b*, 14*c* are located on the same circle around the original point 14*a*. More particularly, a distance from the original point 14*a* to the first incident point 14*b* is identical to a distance from the original point 14*a* to the second incident point 14*c*.

Next, the first beam 10, the second beam 11 and the third beam 12 are converged on the surface of the object 5 by the condenser lens 4, and a beam spot 13 serving as a detecting point is formed on the surface of the object 5. In other words, the first beam 10, the second beam 11, and the third beam 12 which have passed through the condenser lens 4 are overlapped with each other at the surface of the object 5 to form the beam spot 13 on the surface of the object 5. In this case, since the first and second incident points 14*b*, 14*c* are located on the same circle around the original point 14*a*, an incident angle of the second beam 11 upon the surface of the object 5 is identical to an incident angle of the third beam 12 upon the surface of the object 5.

Next, the first beam 10, the second beam 11 and the third beam 12 are scattered on the surface of the object 5, and after passing a beat signal outgoing point 16 included in the condenser lens 4, the beams are received in the PD 6. More particularly, the diffused light from the beam spot 13 is received in the PD 6 via the condenser lens 4. In this case, each beam diffused on the surface of the object 5 is subjected to the frequency shift according to the moving velocity V of the object 5 and the incident angle to the surface of the object 5, and after passing the beat signal outgoing point 16 on the condenser lens 4 as a interference wave (beat) signal 15 showing beat, it comes incident upon the PD 6.

Next, the PD 6 performs photoelectric (light/electricity) conversion on the diffused light from the beam spot 13 to detect the beat signal 15. In this case, the diffused light passes the beat signal outgoing point 16 on a straight line of Y=X in a third quadrant of the X-Y plane, so that the diffused light derived from the second beam 11 and the diffused light derived from the third beam 12 are guided to the PD 6 at almost the same amount of light. This makes it possible to set an S/N (Signal/Noise) ratio of an X(x) axis component of the beat signal 15 almost equal to an S/N ratio of an Y(y) axis component of the beat signal 15, so that detection accuracy of the moving velocity is improved.

Next, the analog signal outputted from the PD 6 goes to the amplifier 7, in which after the background noise of the analog signal is filtered out by BPF (Band Pass Filter) and the like, an AC (Alternating Current) component of the signal is amplified for waveform shaping.

Next, the analog signal whose S/N ratio has been improved by the waveform shaping in the amplifier 7 is converted to a digital signal in the A/D converter 8.

Next, the digital signal from the A/D converter 8 is received in the FFT computing unit 9. The FFT computing unit 9 detects the frequency of the beat signal 15.

A detailed description will be given of the beat signal 15 to be detected in the PD 6 below.

In the optical system in the present embodiment shown in FIG. 1, the beat signal 15 detected in the PD 6 has up to three frequencies corresponding to the moving direction of the object 5 to be measured. These three frequencies are: a frequency 1 or $f_{d1}$ of a beat signal 1 generated by interference of the first beam 10 and the second beam 11; a frequency 2 or $f_{d2}$ of a beat signal 2 generated by interference of the first beam 10 and the third beam 12; and a frequency 3 or $f_{d3}$ of a beat signal 3 generated by interference of the-second beam 11 and the third beam 12. If the moving velocity V of the object 5 is vector-resolved into $V_x$ (an x axis component) and $V_y$ (a y axis component), the $V_x$ can be detected from the beat signal 1 and the $V_y$ can be detected from the beat signal 2.

The first beam 10 comes incident upon the surface of the object 5 perpendicularly thereto along the z axis, while the second beam 11 and the third beam 12 come incident upon the surface of the object 5 at an incident angle of θ. Consequently, referring to the expressions from Equation (4) to Equation (7), frequency 1 or $f_{d1}$ of the beat signal 1 can be expressed as shown below, provided that α=0 and β=θ in Equation (8):

$$2f_{d1} = \frac{V_x}{\lambda} \cdot \sin\theta \tag{15}$$

The frequency 2 or $f_{d2}$ of the beat signal 2 can be expressed as shown below, provided that α=0 and β=θ in Equation (8):

$$2f_{d2} = \frac{V_y}{\lambda} \cdot \sin\theta \tag{16}$$

The frequency 3 or $f_{d3}$ of the beat signal 3 can be expressed as shown below, provided that α=β=θ in Equation (8):

$$f_{d3} = \frac{|V_x \pm V_y|}{2\lambda} \cdot \sin\theta = |f_{d1} \pm f_{d2}| \tag{17}$$

It is to be noted that as the plus/minus sign in Equation (17), a minus sign "−" is used when the object 5 moves from the state of FIG. 1 toward the first quadrant or the third quadrant, whereas a plus sign "+" is used when the object 5 in the state of FIG. 1 moves toward the second quadrant or the fourth quadrant.

By using Equation (15) to Equation (17), each of the first beam 10, the second beam 11 and the third beam 12 diffused by the object 5 can be described as shown below with reference to Equation (1) and Equation (2):

First Beam 10: $I_1 = E_1 \cdot \cos\{2\pi(f_0)t + \phi_1\}$ (18)

Second Beam 11: $I_2 = E_2 \cdot \cos\{2\pi(f_0 \pm f_{d1})t + \phi_2\}$ (19)

Third Beam 12: $I_3 = E_3 \cdot \cos\{2\pi(f_0 \pm f_{d2})t + \phi_3\}$ (20)

Here, selection of the plus/minus signs in Equation (19) and Equation (20) is determined according to Table 1.

TABLE 1

COMBINATION OF MOVING DIRECTIONS OF OBJECT TO BE MEASURED AND SIGNS

| | Moving direction | | | |
|---|---|---|---|---|
| | First quadrant | Second quadrant | Third quadrant | Fourth quadrant |
| fd1 | + | − | − | + |
| fd2 | + | + | − | − |

It is to be noted that in Table 1, the "first quadrant" refers to a direction from an original point of x and y axes (0,0) to the first quadrant, the "second quadrant" refers to a direction from the original point of x and y axes (0,0) to the second quadrant, the "third quadrant" refers to a direction from the original point of x and y axes (0,0) to the third quadrant, and the "fourth quadrant" refers to a direction from the original point of x and y axes (0,0) to the fourth quadrant.

Therefore, the beat signal 15 of these three beams detected in the PD 6 can be expressed as shown below with reference to Equation (3):

$$\langle |I_1 + I_2 + I_3|^2 \rangle = \langle I_1^2 + I_2^2 + I_3^2 + 2 \cdot (I_1 I_2 + I_1 I_3 + I_2 I_3) \rangle \quad (21)$$

$$= \frac{E_1^2 + E_2^2 + E_3^2}{2} +$$

$$E_1 E_2 \cos\{2\pi(f_{d1})t - (\phi_1 - \phi_2)\} +$$

$$E_1 E_3 \cos\{2\pi(f_{d2})t - (\phi_1 - \phi_3)\} +$$

$$E_2 E_3 \cos\{2\pi(f_{d1} \pm f_{d2})t - (\phi_2 - \phi_3)\}$$

This proves that the beat signal is formed from mixture of three frequencies as described before.

The plus/minus sign in Equation (21) is "−" when the object 5 moves from the position shown in FIG. 1 toward the first quadrant or the third quadrant, whereas the sign is "+" when the object 5 moves from the position shown in FIG. 1 toward the second quadrant or the fourth quadrant.

The signal defined by Equation (21) is detected in the PD 6, and a DC (Direct Current) component in Equation (21) is filtered out by the BPF in the amplifier 7, while an AC component in Equation (21) is amplified in an amplifier circuit using an operational amplifier and the like in the amplifier 7. As a result, the signal defined in Equation (21) becomes a signal with a good S/N ratio. Then, the signal is inputted into the A/D converter 8 so as to be converted to a digital signal. Based on the digital data, the spectrum of the signal is obtained in the FFT computing unit 9 of the following stage, and by detecting a peak frequency in the spectrum, the frequencies of $f_{d1}$ and $f_{d2}$ are detected.

As described above, the second beam 11 comes incident upon the beam spot 13 along the x-z plane, and the third beam 12 comes incident upon the beam spot 13 along the y-z plane. Because the x-z plane and the y-z plane are orthogonal to each other, the moving velocity V of the object 5 can be obtained by using the velocity components $V_x$ and $V_y$ as shown in Equation (22) below:

$$V = \sqrt{V_x^2 + V_y^2} \quad (22)$$

$$= \frac{\lambda}{\sin\theta} \sqrt{f_{d1}^2 + f_{d2}^2}$$

Figure 2A:
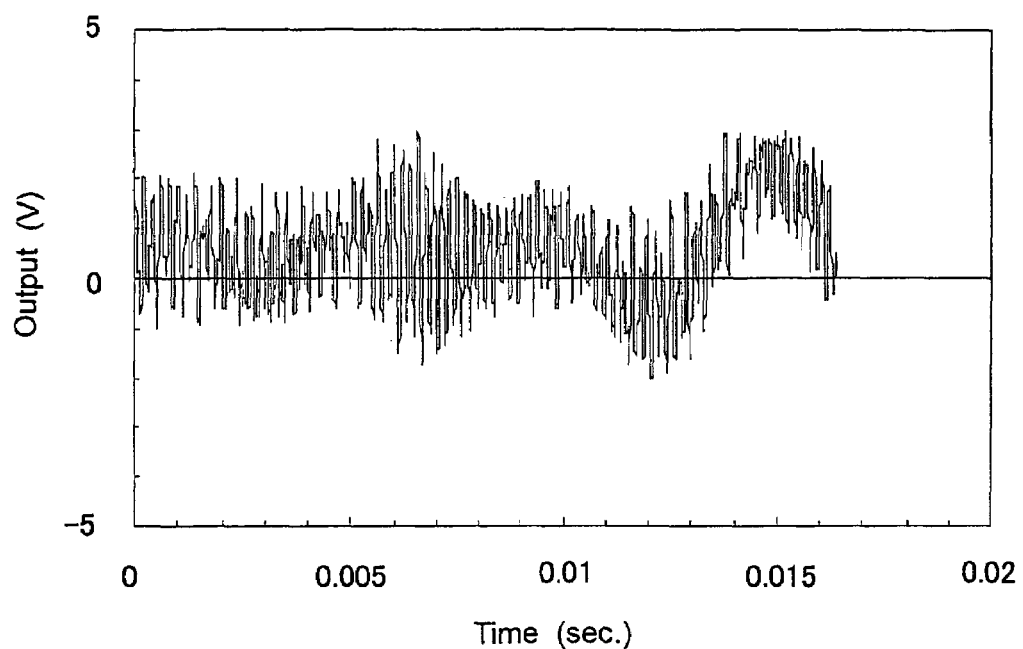
FIG. 2A is a graph showing the waveform of a beat signal when an object to be measured is moved in a direction forming an angle of 155° with an X axis.
Figure 2B:
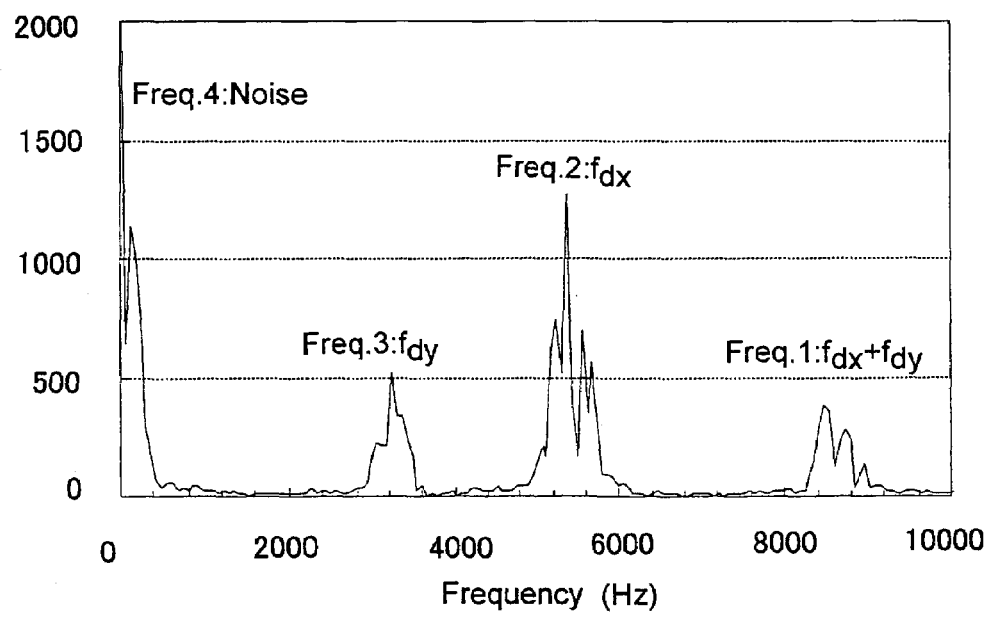
FIG. 2B is a graph view showing an FFT spectrum of the beat signal.

FIGS. 2A and 2B show the waveform and the FFT spectrum of the beat signal 15 when the object 5 in the state of FIG. 1 is moved to a direction forming an angle of 155° with the x axis.

As shown in FIG. 2B, the FFT spectrum has four peak frequencies, though the frequency 4 in the graph is low-frequency noise attributed to the surface reflection of the object 5 and is not a signal subjected to the Doppler frequency shift induced by movement of the object 5. In FIGS. 2A and 2B, the object 5 is moved from the state of FIG. 1 to a direction forming an angle of 155° with the x axis. More particularly, the object 5 in the state of FIG. 1 is moved in a direction toward the second quadrant. In this case, the plus sign "+" is selected in Equation (21), so that frequencies in FIG. 2B are as follows: frequency $1 = f_{dx} + f_{dy}$; frequency $2 = f_{dx}$; and frequency $3 = f_{dy}$. Thus, when the object 5 in the state of FIG. 1 moves in a direction toward the second quadrant, frequency 1, a maximum frequency, is removed, and frequency 2 and frequency 3 are substituted into Equation (22), whereby the moving velocity V of the object 5 is obtained. This discussion also applies to the case where the object 5 in the state of FIG. 1 moves in a direction toward the fourth quadrant. It is to be noted that in FIG. 2B, frequency 1 is an example of the first peak frequency, frequency 2 is an example of the second peak frequency, and frequency 3 is an example of the third peak frequency.

Figure 3A:
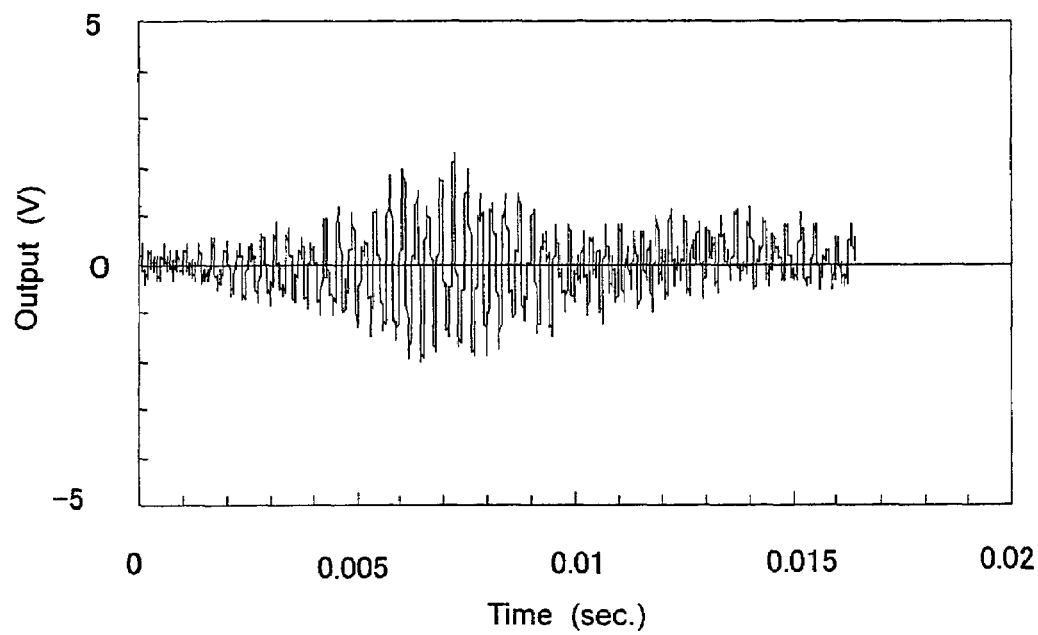
FIG. 3A is a graph showing the waveform of a beat signal when an object to be measured is moved in a direction forming an angle of 135° with the X axis.
Figure 3B:
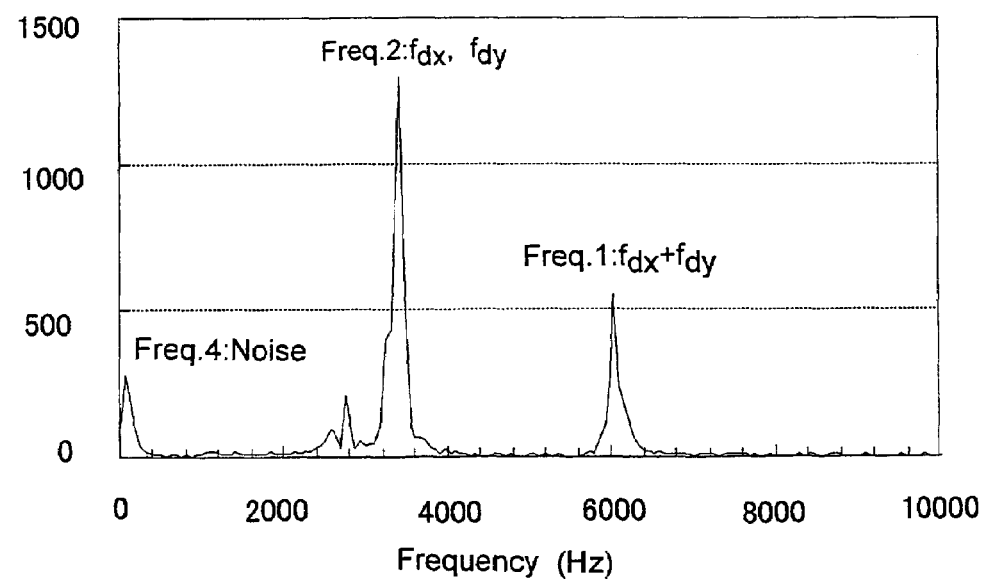
FIG. 3B is a graph view showing an FFT spectrum of the beat signal.

FIGS. 3A and 3B show the waveform and the FFT spectrum of the beat signal 15 when the object 5 in the state of FIG. 1 is moved to a direction forming an angle of 135° with the x axis.

In the case of FIGS. 3A and 3B, as with the case of FIGS. 2A and 2B, the object 5 in the state of FIG. 1 is moved in a direction toward the second quadrant. When the object 5 in the state of FIG. 1 moves to a direction forming an angle of 135° with the x axis, an x axis component of the moving velocity V and a y axis component of the moving velocity V, which are obtained by performing vector resolution of the moving velocity V of the object 5, become equal, and an incident angle of the second beam 11 incident upon the beam spot 13 and an incident angle of the third beam 12 incident upon the beam spot 13 also become equal, so that $f_{dx} = f_{dy}$. Consequently, in FIG. 3B, frequency 2 is formed as one peak of a sum of two components, $f_{dx}$ and $f_{dy}$. Also, frequency 1 which is a frequency twice as large as $f_{dx}$ or $f_{dy}$, is formed, but no frequency 3 as shown in FIG. 2B is formed. Thus, when there are only two peaks, a higher frequency, that is frequency 1, is removed, and a lower frequency, that is frequency 2, is deemed as $f_{dx}$ and $f_{dy}$, which are substituted into Equation (22) so as to obtain the moving velocity V of the object 5. This discussion also applies to the case where the object 5 in the state of FIG. 1 moves to a direction forming an angle of 315° with the x axis. In this case, the object 5 in the state of FIG. 1 moves in a direction toward the fourth quadrant. It is to be noted that in FIG. 3B, frequency 1 is an example of the first peak frequency and frequency 2 is an example of the second peak frequency.

Figure 4A:
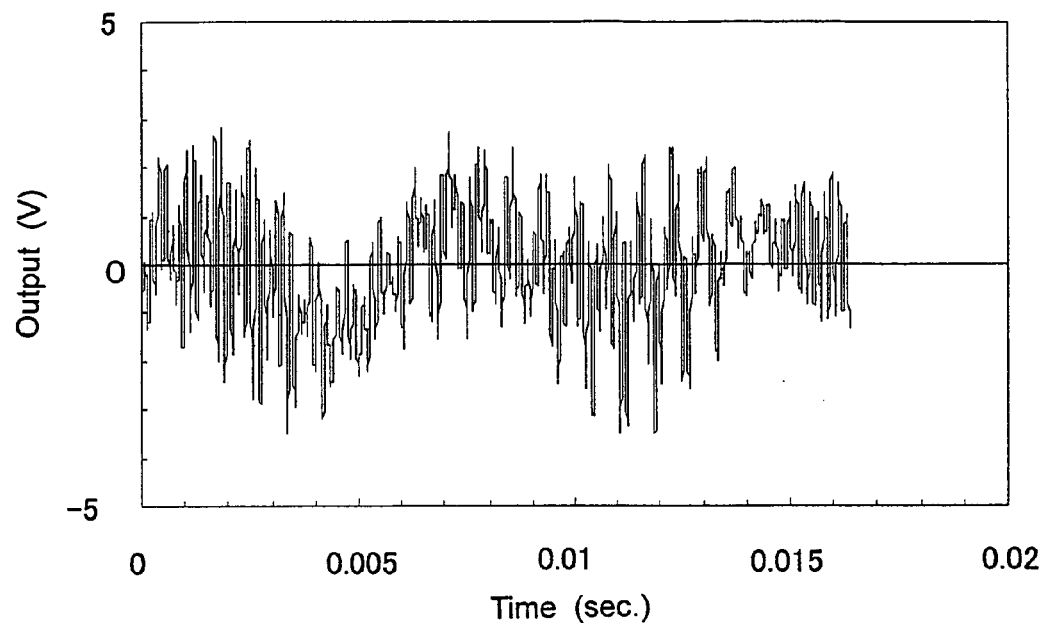
FIG. 4A is a graph showing the waveform of a beat signal when an object to be measured is moved in a direction forming an angle of 15° with the X axis.
Figure 4B:
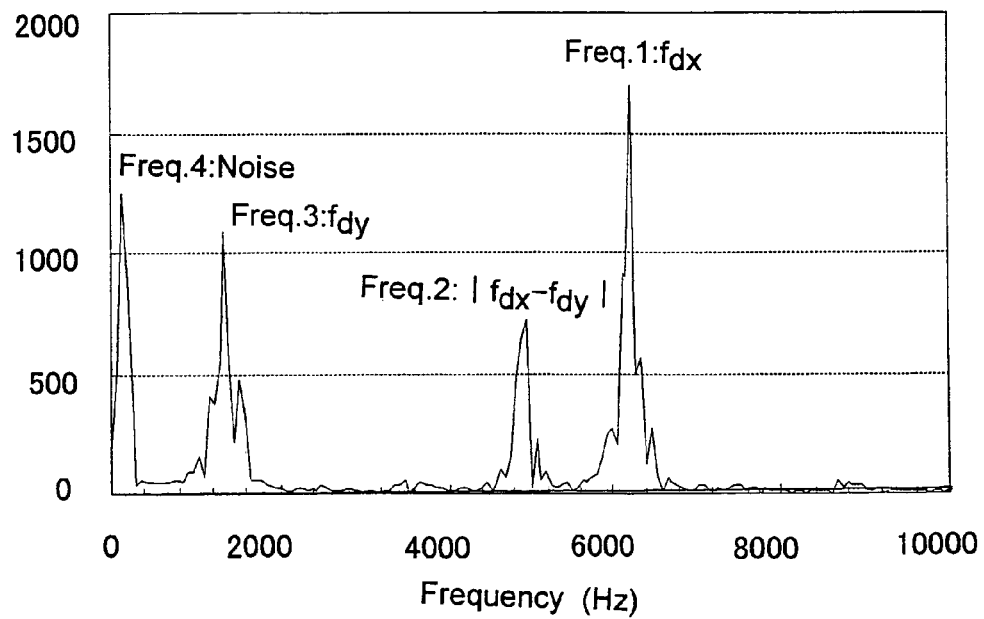
FIG. 4B is a graph view showing an FFT spectrum of the beat signal.

FIGS. 4A and 4B show the waveform and the FFT spectrum of the beat signal 15 when the object 5 to be measured is moved from the position shown in FIG. 1 to a direction forming an angle of 15° with the x axis.

In FIG. 4B, as in FIG. 2B, a frequency 4 is not a signal but a low-frequency noise. In FIGS. 4A and 4B, the object 5 in the state of FIG. 1 is moved to a direction forming an angle of 15° with the x axis. More particularly, the object 5 in the state of FIG. 1 is moved in a direction toward the first quadrant. In this case, the selected sign in Equation (21) is "−", so that frequencies in FIG. 4B are as follows: frequency 1=$f_{dx}$; frequency 2=$|f_{dx}-f_{dy}|$; and frequency 3=$f_{dy}$. Thus, when the object 5 in the state of FIG. 1 moves in a direction toward the first quadrant, frequency 2, a middle frequency, is removed, and frequency 1 and frequency 3 are substituted into Equation (22) so as to obtain the moving velocity V of the object 5. This discussion also applies to the case where the object 5 in the state of FIG. 1 moves in a direction toward the third quadrant. It is to be noted that in FIG. 4B, frequency 1 is an example of the first peak frequency, frequency 2 is an example of the second peak frequency, and frequency 3 is an example of the third peak frequency.

Figure 5A:
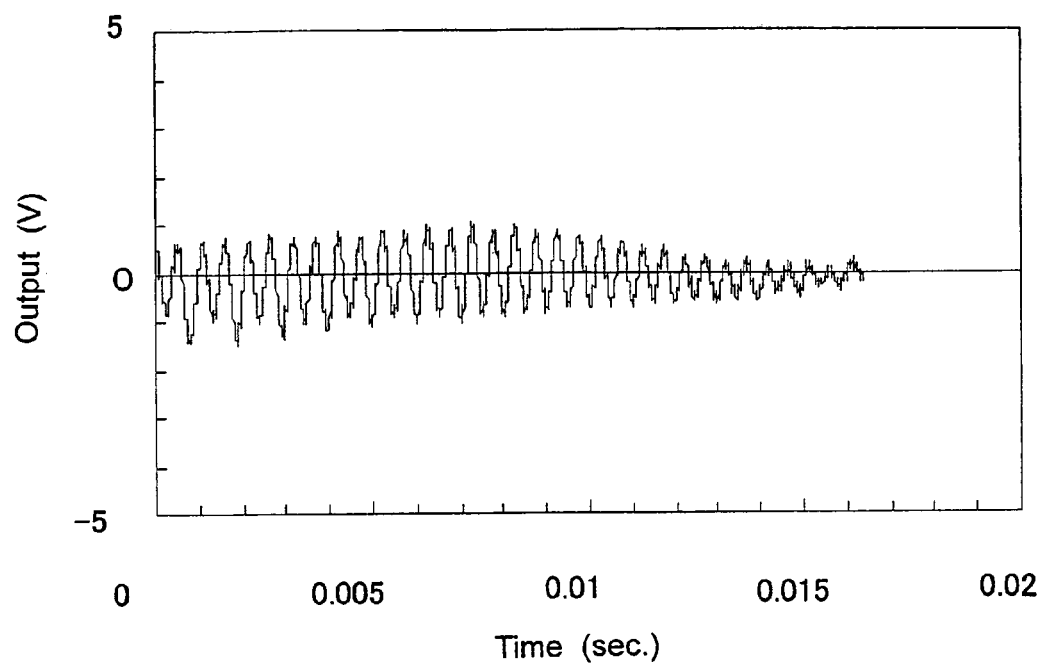
FIG. 5A is a graph showing the waveform of a beat signal when an object to be measured is moved in a direction forming an angle of 45° with the X axis.
Figure 5B:
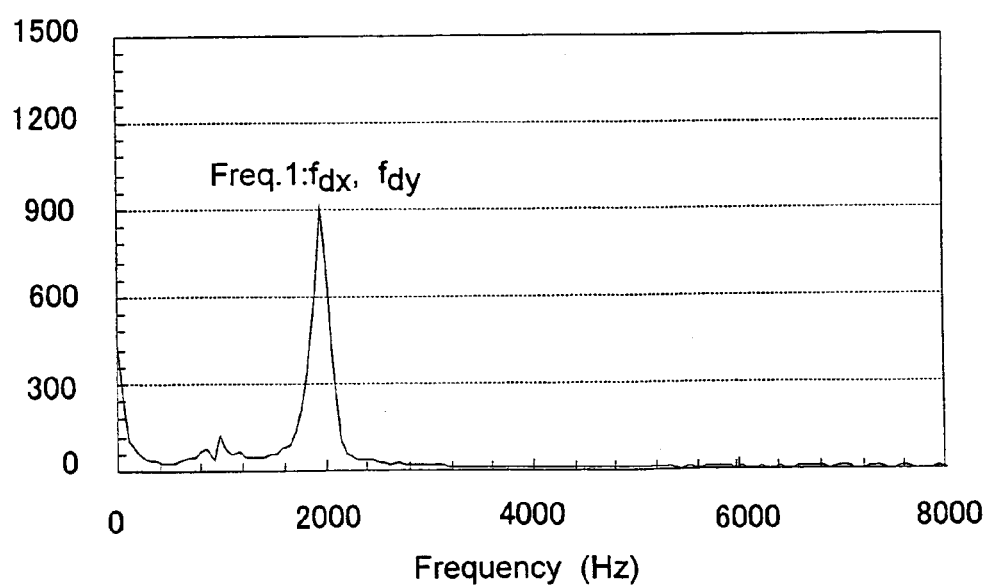
FIG. 5B is a graph view showing an FFT spectrum of the beat signal.

FIGS. 5A and 5B show the waveform and the FFT spectrum of the beat signal 15 when the object 5 to be measured in the state of FIG. 1 is moved to a direction forming an angle of 45° with the x axis.

In the case of FIGS. 5A and 5B, as with the case of FIGS. 4A and 4B, the object 5 in the state of FIG. 1 is moved in a direction toward the first quadrant. When the object 5 in the state of FIG. 1 moves to a direction forming an angle of 45° with the x axis, an x axis component and a y axis component of the moving velocity V, which are obtained by performing vector resolution of the moving velocity V of the object 5, are equal as with FIGS. 3A and 3B, and an incident angle of the second beam 11 upon the beam spot 13 and an incident angle of the third beam 12 upon the beam spot 13 are also equal, so that $f_{dx}=f_{dy}$ is satisfied. Consequently, frequencies detected by the PD 6 are: $f_{dx}$; $f_{dy}$; and $f_{dx}-f_{dy}$. But, because $f_{dx}=f_{dx}$ holds, $f_{dx}-f_{dy}$ is 0 in the case of FIG. 5B, as a result of which only one peak frequency is detected in the PD 6. Thus, if there is only one peak, then that peak frequency is deemed as each of $f_{dx}$ and $f_{dy}$, which are substituted into Equation (22) so as to obtain the moving velocity V of the object 5. This discussion also applies to the case where the object 5 in the state of FIG. 1 moves to a direction forming an angle of 225° with the x axis. In this case, the object 5 in the state of FIG. 1 moves in a direction toward the third quadrant.

Figure 6A:
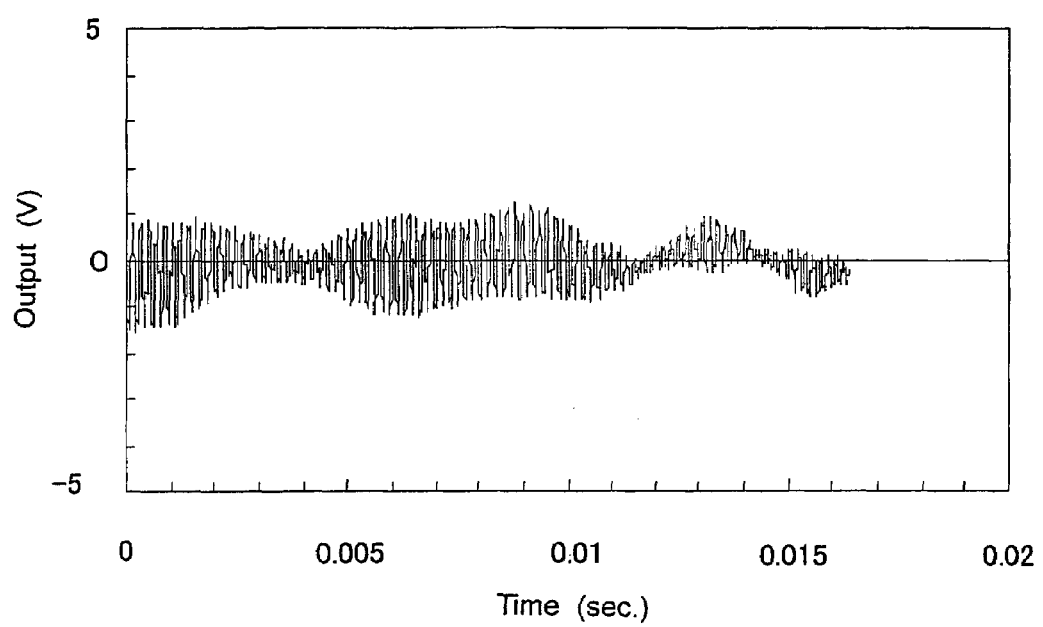
FIG. 6A is a graph showing the waveform of a beat signal when an object to be measured is moved in a positive X axis direction.
Figure 6B:
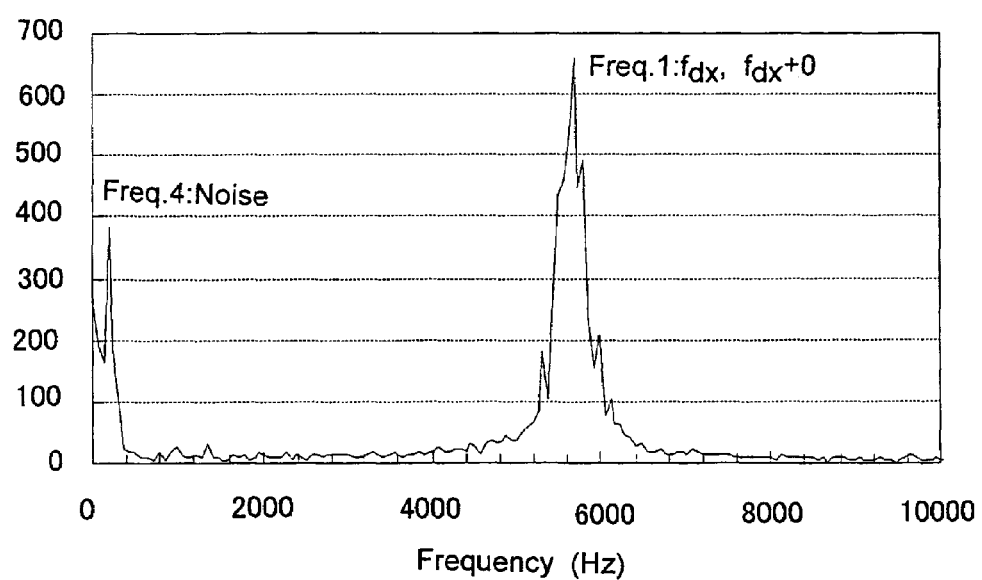
FIG. 6B is a graph view showing an FFT spectrum of the beat signal.

FIGS. 6A and 6B show the waveform and the FFT spectrum of the beat signal 15 when the object 5 in the state of FIG. 1 is moved to a positive x-axis direction.

As shown in FIG. 6B, a velocity component in the y axis direction is 0, so that only one peak frequency $f_{dx}$ exists. Thus, when the object 5 moves to the x or y axis direction, only one peak frequency exists, and the moving velocity of the object 5 can be obtained only with this peak frequency.

However, as shown in FIGS. 5A and 5B, when the object 5 moves to a direction of 45° in the first quadrant and to a direction of 135° in the third quadrant as well, only one peak frequency is generated. Therefore, it is considered to be quite difficult to distinguish the case of FIGS. 5A and 5B from the case of FIGS. 6A and 6B. Consequently, when monitoring the movement of the object 5 of which the moving direction is limited at some extent and therefore, which moves along a direction forming an angle of, for example, not more than |±45|° with the x axis, it can be said that in view of ease of velocity detection, an incident point of laser light should preferably be set so that the moving direction of the object 5 coincides with the direction of FIGS. 2A and 2B or the direction of FIGS. 4A and 4B. More particularly, in order to facilitate detection of the moving velocity V and the moving direction of the object 5, the first incident point 14b of the second beam 11 on the condenser lens 4 and the second incident point 14c of the third beam 12 on the condenser lens 4 should preferably be set so that the direction of FIGS. 2A and 2B or the direction of FIGS. 4A and 4B is the moving direction of the object 5.

Figure 7:
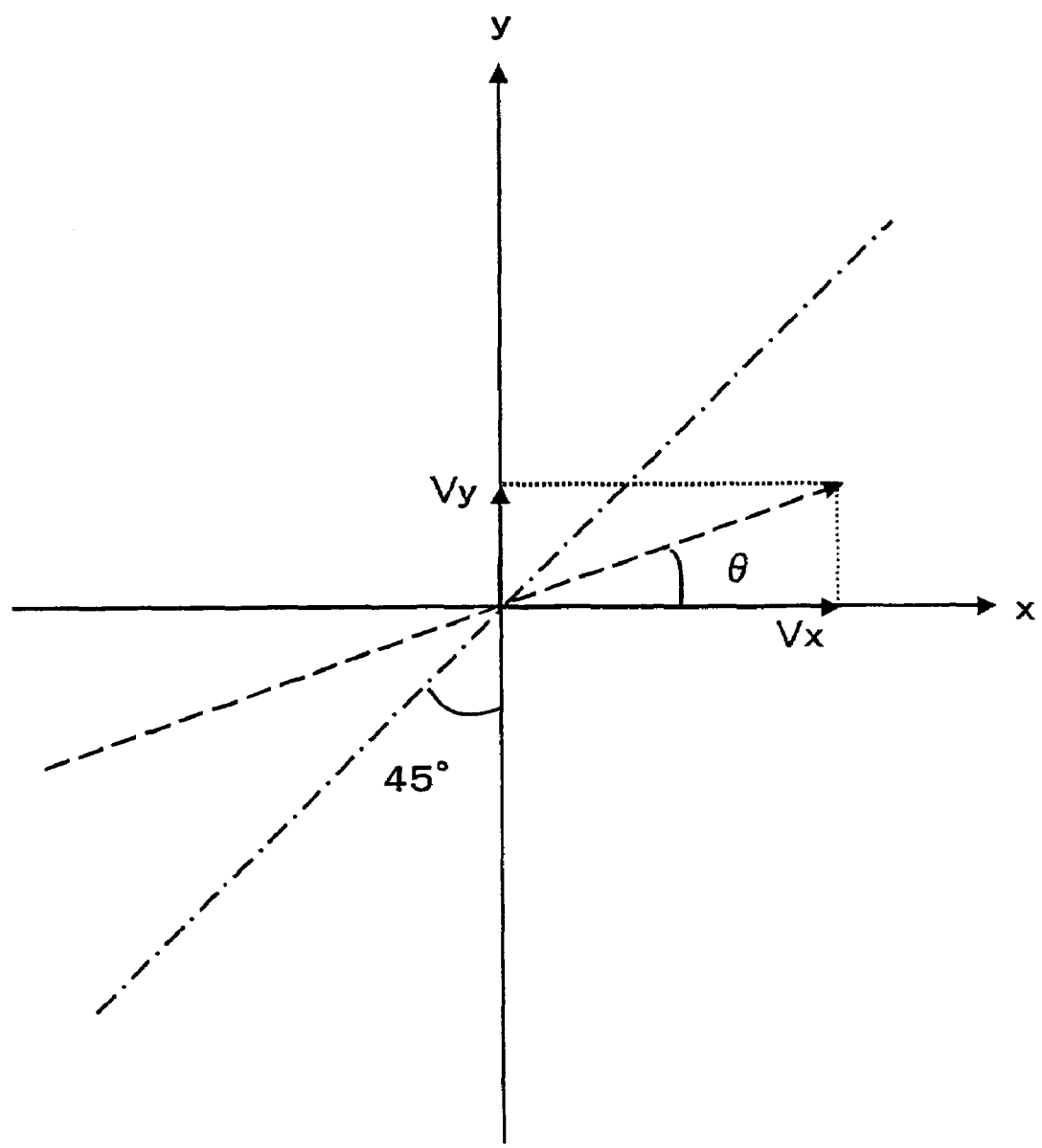
FIG. 7 is an explanatory view showing the manner how the moving direction of the object to be measured is measured by the LDV in Embodiment 1.

Further, as described above, when the object 5 moves to a direction forming an angle of, for example, larger than −45° but smaller than 45° with the x axis, it is possible to easily identify the moving direction of the object 5 by obtaining a ratio of a component in the x axis direction and a component in the y axis direction of the moving velocity V of the object 5. More particularly, as shown in FIG. 7, in the case where a dotted-line arrow representing the moving direction of the object 5 intersects with the x axis at an angle of less than 45° but not less than 0°, if the moving velocity V of the object 5 is vector-resolved into an x axis component $V_x$ and a y axis component $V_y$, then $V_x > V_y$ is satisfied. In this case, when a low-frequency noise component is removed from the peak frequencies obtained from the FFT spectrum as stated above, frequency 1, which is the highest frequency, is $f_{dx}$, and frequency 3, which is the lowest frequency, is $f_{dy}$. Thus, if the following equation is calculated, the moving direction of the object 5 can be obtained:

$$\tan\theta = \frac{f_{dy}}{f_{dx}} \tag{23}$$

In the case of FIGS. 4A and 4B for example, $f_{dy}/f_{dx}$ is 0.23, and therefore it can be determined that the object 5 moves in a direction forming an angle of approx. 13° with the x axis.

Further, when the moving direction of the object 5 is in the range of angles of more than −45° and not less than 0°, i.e., when the object 5 moves to a direction forming an angle of, for example, less than 135° and not less than 90° with the x axis, the same processing can be applied. In this case, if a low-frequency noise component is removed from the FFT spectrum, frequency 1, which is the highest frequency, is $f_{dy}$, and frequency 3, which is the lowest frequency, is $f_{dx}$. By substituting the $f_{dy}$ and $f_{dx}$ in Equation (23), the moving direction of the object 5 is obtained.

Description has been given of the detection using Equation (23) of the moving direction of the object 5 at angles in the positive direction with respect to the x axis. The moving direction in the negative direction can also be obtained in a similar manner, though the description thereof is omitted.

Further, description has been given of the detection using Equation (23) of the moving directions of the object 5 toward the first quadrant and the third quadrant. The moving directions of the object 5 toward the second quadrant and the fourth quadrant can also be obtained through the same processing as for the first quadrant and the third quadrant, though the description thereof is omitted.

The present embodiment is effective for detecting the moving velocity V and the moving direction of the object 5 which moves to a direction forming an angle of 0° or larger but less than 45° with the x axis or y axis, or to a direction forming an angle of more than −45° but not more than 0° with the x axis or y axis.

Although the LD 1 is used as an example of the semiconductor light-emitting device in Embodiment 1, an LED (Light Emitting Diode) may be used as the semiconductor light-emitting device. However, LDs are much better in coherency than LEDs and therefore beat attributed to interference of two beams shown in Equation (3) is easily generated. Because of this reason, LDs are more preferably used than LEDs as an example of the semiconductor light-emitting device.

Further, although the BS 2a and BS 2b are used as means to split a beam emitted from the LD1 into three beams in Embodiment 1, the BS 2a, 2b may be replaced with, for example, a diffraction grating. The diffraction grating should be disposed such that the extending direction of its slits is orthogonal to an optical axis of the beam emitted from the LD1.

Further, although the first beam 10, the second beam 11 and the third beam 12 are collected into one point on the surface of the object 5 by the condenser lens 4 in Embodiment 1, the first beam 10, the second beam 11 and the third beam 12 may be reflected by, for example, an appropriate mirror to one spot on the surface of the object 5. That is, the first beam 10, the second beam 11 and the third beam 12 may be reflected by an appropriate mirror to form the beam spot 13 on the surface of the object 5.

Although the first plane which includes the first beam 10 extending from the BS 2b to the condenser lens 4 and the second beam 11 extending from the mirror 3b to the condenser lens 4 intersects with the second plane which includes the first beam 10 extending from the BS 2b to the condenser lens 4 and the third beam 12 extending from the mirror 3a to the condenser lens 4 at an angle of 90° in Embodiment 1, the first plane may intersect with the second plane at an angle other than 90°.

Although the first plane and the second plane intersect with the X-Y plane at an angle of 90° in Embodiment 1, the first plane and the second plane may intersect with the X-Y plane at an angle other than 90°.

Although the original point 14a, the first incident point 14b and the second incident point 14c form a right angled triangle in Embodiment 1, the original point 14a, the first incident point 14b and the second incident point 14c may form a triangle other than the right angled triangle. Further, the triangle formed by the original point 14a, the first incident point 14b and the second incident point 14c may be set so as to be included in a quadrant other than the first quadrant with respect to the X and Y axes, e.g., in the third quadrant.

Although the optical system is set such that the optical axis of the beat signal 15 intersects with a straight line represented by Y=X in Embodiment 1, the optical system may be set such that the optical axis of the beat signal 15 intersects with any other straight line.

Although in Embodiment 1 the beat signal 15 passes the third quadrant with respect to the X and Y axes, the beat signal 15 may pass the second quadrant or the fourth quadrant.

The above-described various modifications to Embodiment 1 are applicable to all the following embodiments similarly. However, in the following embodiments, such description is omitted.

Embodiment 2

Figure 8:
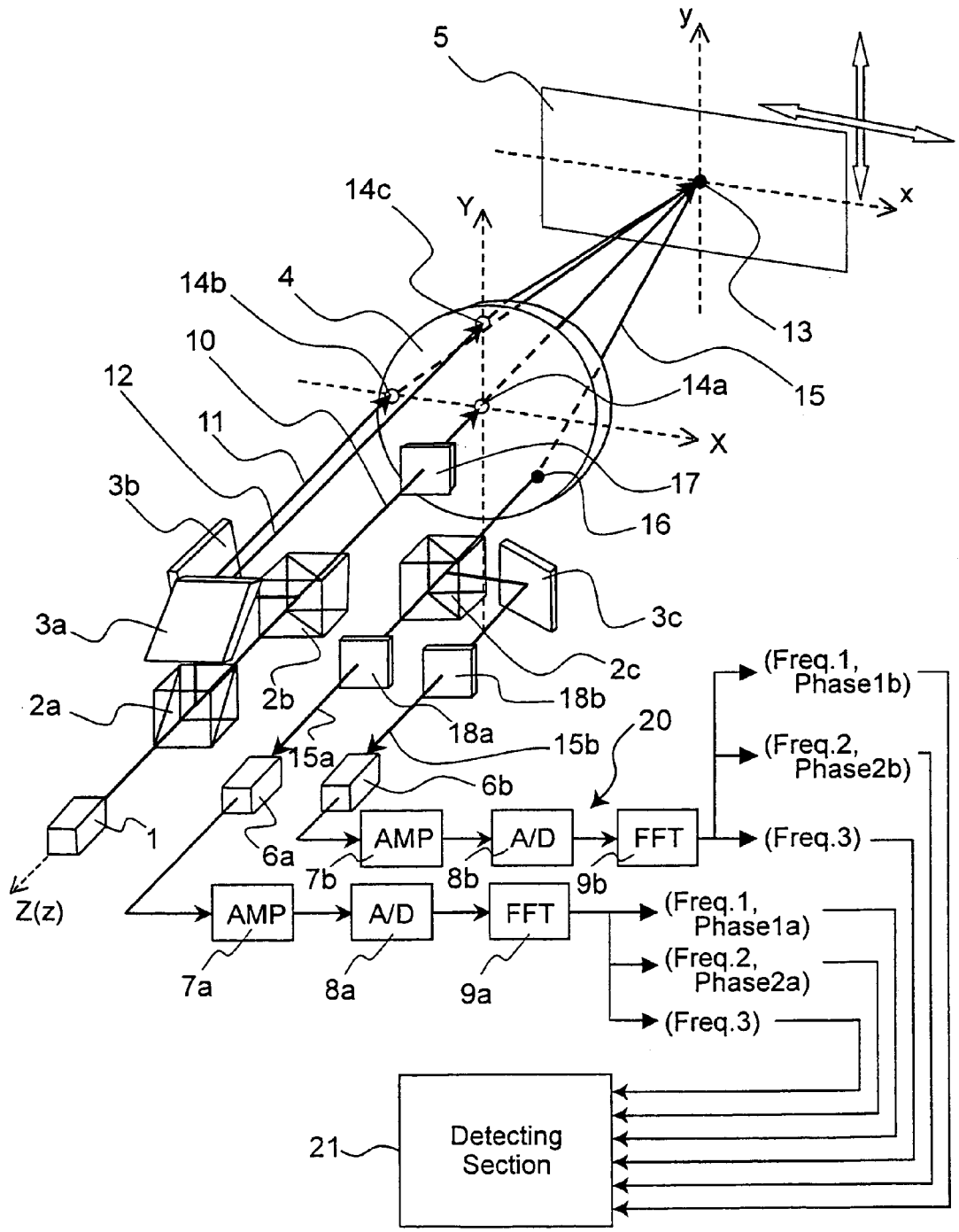
FIG. 8 is a schematic view showing the configuration of an LDV in Embodiment 2 of the present invention.

FIG. 8 is a schematic view showing the configuration of an LDV in Embodiment 2 of the present invention. In FIG. 8, only main component parts such as optical components are illustrated and other components such as components for holding the optical components are omitted from FIG. 8. Arrowed broken lines in FIG. 8 represent coordinate axes. It is to be noted that in FIG. 8, the X axis and x axis are parallel, the Y axis and y axis are parallel, and the Z axis and z axis are identical. Moreover, in FIG. 8, component parts identical to the component parts of Embodiment 1 shown in FIG. 1 are designated by the reference numerals identical to those of the component parts in FIG. 1, and description thereof is omitted here.

The LDV here includes a quarter-wavelength plate 17 exemplifying the wavelength plate disposed on the optical axis of the first beam 10, and a BS 2c exemplifying the second beam splitting device disposed on the optical axis of the beat signal 15.

The quarter-wavelength plate 17 is positioned between the BS 2b and the condenser lens 4, and the first beam 10 passes therethrough. The quarter-wavelength plate 17 is disposed such that a phase advance axis and a phase delay axis are inclined 45° relative to the polarization direction of the incident beam. Explaining it with use of the X and Y coordinate axes on the condenser lens 4 by way of example, the quarter-wavelength plate 17 is disposed such that the phase advance axis is parallel to a line of Y=X and that the phase delay axis is parallel to a line of Y=−X, or the quarter-wavelength plate 17 is disposed such that the phase delay axis is parallel to the line of Y=X and that the phase advance axis is parallel to the line of Y=−X. By disposing the quarter-wavelength plate 17 in this manner, the first beam 10 passing the quarter-wavelength plate 17 is converted from the linearly polarized beam to the circularly polarized beam.

The BS 2c is disposed so that the beat signal 15, which has passed the beat signal outgoing point 16 on the condenser lens 4 and become a parallel beam, is incident thereon. The beat signal 15 is split by the BS 2c into two beams: a beam indicative of a beat signal 15a exemplifying the first light signal and a beam indicative of a beat signal 15b exemplifying the second light signal. Then, the beat signal 15a comes incident upon a PD 6a exemplifying the first light detecting device through a first linear polarizer 18a. The beat signal 15b, after its traveling direction is changed by a mirror 3c, comes incident upon a PD 6b exemplifying the second light detecting device through a second linear polarizer 18b. The first and second linear polarizers 18a, 18b are disposed so that an optical axis of the first linear polarizer 18a is orthogonal to an optical axis of the second linear polarizer 18b. For example, the first linear polarizer 18a is disposed so that its optical axis is in the same direction as the phase advance axis of the quarter-wavelength plate 17, while the second linear polarizer 18b is disposed so that its optical axis is in the same direction as the phase delay axis of the quarter-wavelength plate 17. Alternatively, the first linear polarizer 18a is disposed so that its optical axis is in the same direction as the phase delay axis of the quarter-wavelength plate 17, while the second linear polarizer 18b is disposed so that the optical axis is in the same direction as the phase advance axis of the quarter-wavelength plate 17. The beat signals 15a, 15b received by the PDs 6a, 6b pass amplifiers 7a, 7b and A/D converters 8a, 8b in the signal processing circuit 20 in sequence, and then go into FFT computing units 9a, 9b. Frequencies and phases of the beat signals 15a, 15b are detected in the FFT computing units 9a, 9b and outputted to the detecting section 21.

Detailed description will be given of the beat signals 15a, 15b detected in the PDs 6a, 6b below.

Since the first beam 10 incident upon the surface of the object 5 has been converted to circularly polarized light, each of light beams reflected and diffused by the object 5 can be expressed as shown below:

$$\text{Beam 1:} \begin{cases} \frac{E_1}{\sqrt{2}}\cos(2\pi f_0 t) & \text{(i)} \\ \frac{E_1}{\sqrt{2}}\cos\left(2\pi f_0 t + \frac{\pi}{2}\right) & \text{(ii)} \end{cases} \quad (24)$$

$$\text{Beam 2: } E_2\cos\{2\pi(f_0 \mp f_{dx})t\} \quad (25)$$

$$\text{Beam 3: } E_3\cos\{2\pi(f_0 \pm f_{dy})t\} \quad (26)$$

wherein the $f_{dx}$ and $f_{dy}$ are components obtained by vector resolution of a frequency shift amount $f_d$, which is in proportion to the moving velocity V of the object 5, into an x axis direction component and a y axis direction component. These three beams are each split by the BS 2c and pass the first and second linear polarizers 18a, 18b, and only a phase advance axis component is detected in the PD 6a while only a phase delay axis component is detected in the PD 6b. Herein, the phase advance axis component is indicated by expression (i) in Equation (24) where phase delay is not generated, whereas the phase delay axis component is indicated by expression (ii) in Equation (24) where phase delay of $\pi/2$ is generated. Moreover, although the second beam 11 and the third beam 12 represented by Equation (25) and Equation (26) come incident upon the first and second linear polarizers 18a, 18b in the linearly polarized state, an optical axis of each of the first and second linear polarizers 18a, 18b is inclined 45° relative to an oscillation direction of the linearly polarized light, so that components incident upon the PDs 6a, 6b can be deemed as $1/\sqrt{2}$ of Equations (25) and (26). Consequently, the beams incident upon the PD 6a and the PD 6b will be expressed as follows:

$$PD6a: \begin{cases} \frac{E_1}{\sqrt{2}}\cos(2\pi f_0 t) \\ \frac{E_2}{\sqrt{2}}\cos\{2\pi(f_0 \mp f_{dx})t\} \\ \frac{E_3}{\sqrt{2}}\cos\{2\pi(f_0 \pm f_{dy})t\} \end{cases} \quad (27)$$

$$PD6b: \begin{cases} \frac{E_1}{\sqrt{2}}\cos\left(2\pi f_0 t + \frac{\pi}{2}\right) \\ \frac{E_2}{\sqrt{2}}\cos\{2\pi(f_0 \mp f_{dx})t\} \\ \frac{E_3}{\sqrt{2}}\cos\{2\pi(f_0 \pm f_{dy})t\} \end{cases} \quad (28)$$

From the expressions above, the beat signals 15a, 15b detected in the PD 6a and the PD 6b can be expressed as follows:

$$PD15a: \begin{cases} \frac{E_1^2 + E_2^2 + E_3^2}{4} + \\ \frac{E_1 E_2}{2}\cdot\cos(2\pi f_{dx}t) + & (1) \\ \frac{E_1 E_3}{2}\cdot\cos(2\pi f_{dy}t) + & (2) \\ \frac{E_2 E_3}{2}\cdot\cos\{2\pi|f_{dx} \pm f_{dy}|t\} & (3) \end{cases} \quad (29)$$

$$PD15b: \begin{cases} \frac{E_1^2 + E_2^2 + E_3^2}{4} + \\ \frac{E_1 E_2}{2}\cdot\cos\left(2\pi f_{dx}t \pm \frac{\pi}{2}\right) + & (4) \\ \frac{E_1 E_3}{2}\cdot\cos\left(2\pi f_{dy}t \mp \frac{\pi}{2}\right) + & (5) \\ \frac{E_2 E_3}{2}\cdot\cos\{2\pi|f_{dx} \pm f_{dy}|t\} & (6) \end{cases} \quad (30)$$

Selection of the plus/minus signs in Equation (29) and Equation (30) is dependent on the moving direction of the object 5. The list of the selection is shown in the table below.

TABLE 2

COMBINATION OF MOVING DIRECTIONS OF OBJECT TO BE MEASURED AND SIGNS

| | | Equation (29): PD 6a | | | Equation (30): PD 6b | | |
|---|---|---|---|---|---|---|---|
| | | (1) | (2) | (3) | (4) | (5) | (6) |
| Moving direction of object to be measured | First quadrant | − − − | − − − | + | + | − | + |
| | Second quadrant | − − − | − − − | − | − | − | − |
| | Third quadrant | − − − | − − − | + | − | + | + |
| | Fourth quadrant | − − − | − − − | − | + | + | − |

It is to be noted that in Table 2, the "first quadrant" refers to a direction from an original point of x and y axes (0,0) to the first quadrant, the "second quadrant" refers to a direction from the original point of the x and y axes (0,0) to the second quadrant, the "third quadrant" refers to a direction from the original point of the x and y axes (0,0) to the third quadrant, and the "fourth quadrant" refers to a direction from the original point of the x and y axes (0,0) to the fourth quadrant.

In the FFT computing units 9a, 9b, frequencies of the beat signals 15a, 15b are detected in the same manner as in Embodiment 1. At the time of detection of the frequencies through FFT calculation by the FFT computing units 9a, 9b, phases of $f_{dx}$ and $f_{dy}$ are also obtained. Further, the phase of the beat signal 15a, 15b can be obtained from a ratio of a real part to an imaginary part in the result of the FFT calculation. More specifically, the phases $\phi$ of the signals can be obtained from the following expressions.

$$\phi_x = \text{Tan}^{-1}\left(\frac{\text{Im}(FFT(\text{beat})at\,f_{dx})}{\text{Re}(FFT(\text{beat})at\,f_{dx})}\right) \quad (31)$$

$$\phi_y = \text{Tan}^{-1}\left(\frac{\text{Im}(FFT(\text{beat})at\,f_{dy})}{\text{Re}(FFT(\text{beat})at\,f_{dy})}\right)$$

Referring now to FIG. 8, frequency 1, frequency 2 and frequency 3 are detected by the FFT computing unit 9a, and at the same time phase 1a of the signal of frequency 1 and phase 2a of the signal of frequency 2 are detected. At this point, a phase of the signal of frequency 3 is not detected as it is not necessary though the phase of the signal of frequency 3 can also be detected. Frequency 1, frequency 2 and frequency 3 in the present embodiment are handled in a different way from that for frequency 1, frequency 2 and frequency 3 in Embodiment 1. In the present embodiment, frequency 1 or $f_{dx}$ is an x axis directional component, frequency 2 or $f_{dy}$ is a y axis directional component, and frequency 3 is $f_{dx} \pm f_{dy}$. Similarly to the FFT computing unit 9a, the FFT computing unit 9b detects frequency 1, frequency 2 and frequency 3 as well as phase 1b of the signal of frequency 1 and phase 2b of the signal of frequency 2. By detecting a difference between these phases, the moving direction of the object 5 can be identified in accordance with Table 2 above. It is to be noted that in the present embodiment, frequency 1 detected by the FFT computing unit 9a is an example of the fourth peak frequency, frequency 2 detected by the FFT computing unit 9a is an example of the fifth peak frequency, frequency 3 detected by the FFT computing unit 9a is an example of the sixth peak frequency, frequency 1 detected by the FFT computing unit 9b is an example of the seventh peak frequency, frequency 2 detected by the FFT computing unit 9b is an example of the eighth peak frequency, and frequency 3 detected by the FFT computing unit 9b is an example of the ninth peak frequency.

The phase difference is precisely detected as a value of $\pm \pi/2$. However, the moving direction of the object 5 can be determined by detecting only the plus/minus sign as shown in Table 2 above. Since a value of the phase difference is ideally detected as $\pm \pi/2$, it is possible to provide a certain range of threshold values to the phase difference and determine whether the sign is plus or minus in this range, and if the phase difference is out of the range, then the object 5 is determined to be in resting state. This makes it possible to diminish errors of the moving amount caused by operation failure.

In the present embodiment, although the moving velocity V of the object 5 is detected in the same way as in Embodiment 1, detection accuracy of the moving direction of the object 5 is higher than that in Embodiment 1. For example, in Embodiment 1, the same signal is detected for both the movement to the first quadrant direction and the movement to the third quadrant direction in FIG. 7, which makes it impossible to distinguish the movement to the first quadrant direction from the movement to the third quadrant direction. In the present embodiment, however, detecting the phase difference of the signals makes it possible to distinguish the movement to the first quadrant direction from the movement to the third quadrant direction as shown in Table 2.

The present embodiment is effective for detecting movement information about the moving velocity V and the moving direction (moving angle, forward direction of movement, or backward direction of movement) of the object 5 which moves to a direction forming an angle of 0° or more but less than 45° with the x axis or y axis, or to a direction forming an angle of more than −45° and not more than 0° with the x axis or y axis.

In the present embodiment, the moving direction of the object 5 may be obtained from a phase difference between phase 1a of the signal of frequency 1 regarding the beat signal 15a and phase 1b of the signal of frequency 1 regarding the beat signal 15b, and a phase difference between phase 2a of the signal of frequency 2 regarding the beat signal 15a and phase 2b of the signal of frequency 2 regarding the beat signal 15b. Alternatively, the moving direction of the object 5 may be obtained from a phase difference between phase 2a of the signal of frequency 2 regarding the beat signal 15a and phase 2b of the signal of frequency 2 regarding the beat signal 15b as well as from frequency 3 regarding the first and second beat signals 15a, 15b. The moving direction of the object 5 may also be obtained from the phase difference between phase 1a of the signal of frequency 1 regarding the beat signal 15a and phase 1b of the signal of frequency 1 regarding the beat signal 15b, and from frequency 3 regarding the first and second beat signals 15a, 15b.

Embodiment 3

Figure 9:
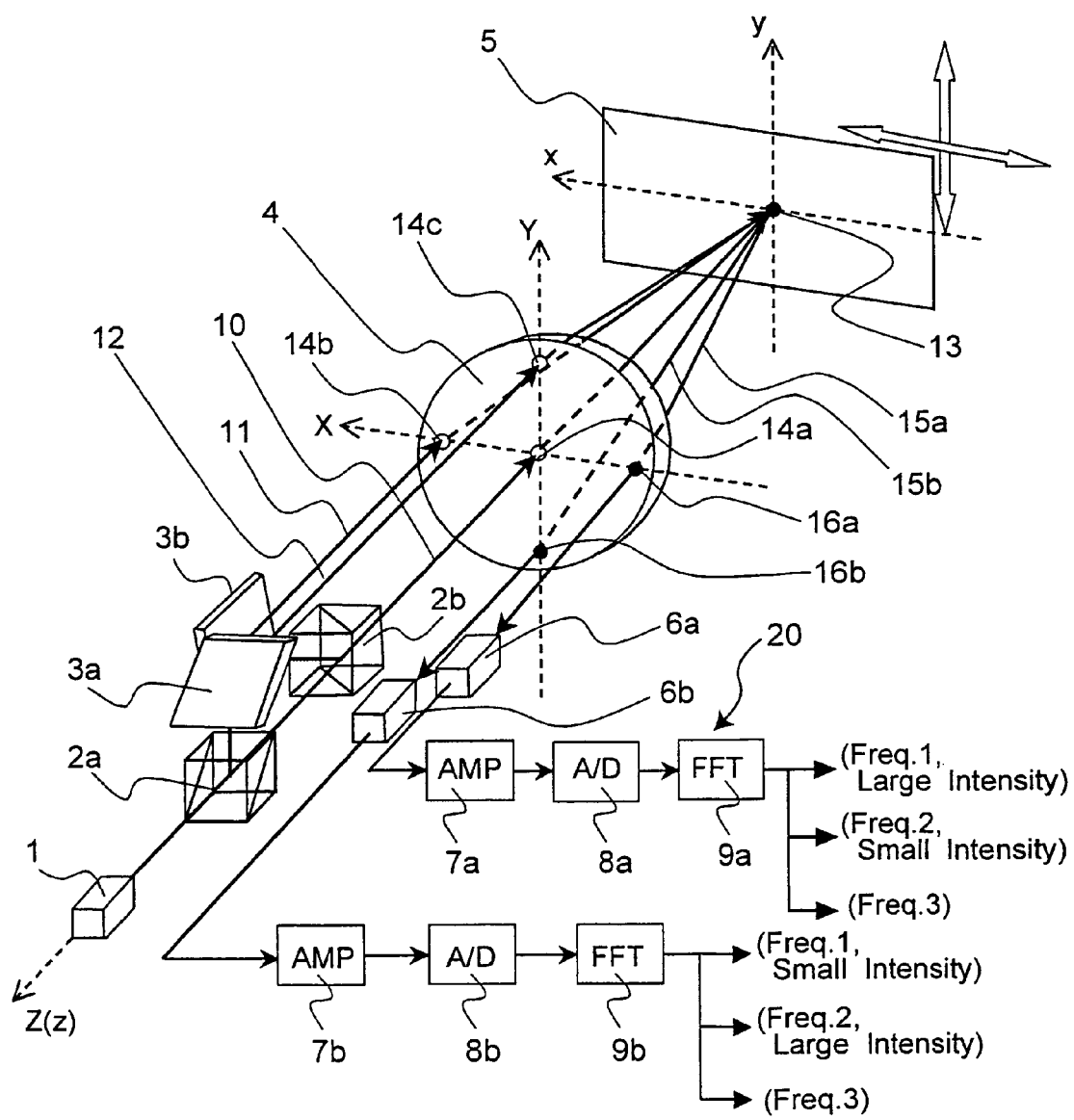
FIG. 9 is a schematic view showing the configuration of an LDV in Embodiment 3 of the present invention.

FIG. 9 is a schematic view showing the configuration of an LDV in Embodiment 3 of the present invention. In FIG. 9, only main component parts such as optical components are illustrated and components for holding the optical components, etc. are omitted. The detecting section is also omitted from FIG. 9. Arrowed broken lines in FIG. 9 represent coordinate axes. It is to be noted that in FIG. 9, the X axis and x axis are parallel, the Y axis and y axis are parallel, and the Z axis and z axis are identical. Moreover, in FIG. 9, component parts identical to the component parts of Embodiment 1 shown in FIG. 1 are designated by the reference numerals identical to those of the component parts in FIG. 1 and description thereof is omitted here.

In the LDV, there are two systems for detecting the beat signals diffused from the beam spot 13. More specifically, beat signals 15a, 15b are emitted from the beam spot 13, and an optical axis of the beam of the beat signal 15a passes a beat signal outgoing point 16a on the condenser lens 4, while an optical axis of the beam of the beat signal 15b passes a beat signal outgoing point 16b on the condenser lens 4. The beat signal outgoing point 16a is positioned on the X axis symmetrically about the original point 14a to the first incident point 14b, and the beat signal outgoing point 16b is positioned on the Y axis symmetrically about the original point 14a to the second incident point 14c. With such disposition of the beat signal outgoing points 16a, 16b, regular reflection light of the second beam 11 is received in the PD 6a and regular reflection light of the third beam 12 is received in the PD 6b.

The beat signal 15a which has passed the beat signal outgoing point 16a enters the PD 6a, and the beat signal 15b which has passed the beat signal outgoing point 16b enters the PD 6b. Each signal detected in the PDs 6a, 6b is processed in the same way as in Embodiment 1, so that each signal is subjected to the same processing as in Embodiment 1. More specifically, after the signals detected by the PDs 6a, 6b undergo noise removal and amplification processes by amplifiers 7a, 7b in the signal processing circuit 20, the signals are converted to digital signals by A/D converters 8a, 8b, and a plurality of peak frequencies are detected by the FFT computing units 9a, 9b. In this case, the plurality of the peak frequencies include a frequency $f_{dx}$ relating to the movement of the object 5 in the x axis direction, a frequency $f_{dy}$ relating to the movement of the object 5 in the y axis direction, and a frequency of $f_{dx} \pm f_{dy}$. The frequency $f_{dx}$ corresponds to frequency 1 in FIG. 9, the frequency $f_{dy}$ corresponds to frequency 2 in FIG. 9, and the frequency of $f_{dx} \pm f_{dy}$ corresponds to frequency 3 in FIG. 9.

The optical intensity of diffused light diffused from the beam spot 13 is largest in the regular reflection direction. Consequently, as for the beat signal 15a, the optical intensity of light derived from the second beam 11 is largest, so that in Equation (21), the following relationship holds:

$$E_2 > E_1, E_3 \tag{32}$$

Further, as for the first beam 10 and the third beam 12, diffused light of both the beams generated by diffuse reflection is included in the beat signal 15a. Since the first beam 10 impinges upon the object 5 perpendicularly, reflection light intensity thereof shows intensity distribution of concentric circles around the z axis, whereas the third beam 12 shows intensity distribution of concentric circles around a light receiving axis connecting the beam spot 13 and the point 16b on the condenser lens 4. Therefore, at the point 16a on the light receiving axis of the beat signal 15a, the following relationship generally holds:

$$E_1 > E_3 \tag{33}$$

Consequently, from Equation (32) and Equation (33), the following relationship is obtained:

$$E_2 > E_1 > E_3 \tag{34}$$

From Equation (34) and Equation (21), the peak intensities in the FFT spectrum of frequency components included in the beat signal 15a have the following relationship:

$$I(f_{dx}) > I(|f_{dx} \pm f_{dy}|) > I(f_{dy}) \tag{35}$$

Similarly to Equation (35), the peak intensities in the FFT spectrum of frequency components included in the beat signal 15b will have the following relationship:

$$I(f_{dy}) > I(|f_{dx} \pm f_{dy}|) > I(f_{dx}) \tag{36}$$

As described in Embodiment 1, in order to determine the peaks of the x axis component and the y axis component, Embodiment 1 utilizes the fact that $f_{dx} > f_{dy}$ is satisfied when the moving direction of the object 5 forms, for example, an angle of less than 45° with the x axis, so that the range of the moving direction of the object 5 is limited. In contrast, in the present embodiment, among a plurality of frequency peaks present in the FFT spectrum, the peak of the x axis component and the peak of y axis component obtained by resolving the vector of the moving velocity V of the object 5 can be easily determined with use of Equations (35) and (36), and by detecting a ratio of the velocity of the x axis component and the velocity of the y axis component with use of Equation (23), it is possible to detect the moving direction which forms an angle of not less than 0° but less than 90° with the x axis.

The present embodiment is effective for detecting movement information about the moving velocity V and the moving direction (moving angle, forward direction of movement and backward direction of movement) of the object 5 which moves to a direction forming an angle of not less than 0° but less than 90° with the x axis or y axis.

Embodiment 4

Figure 10:
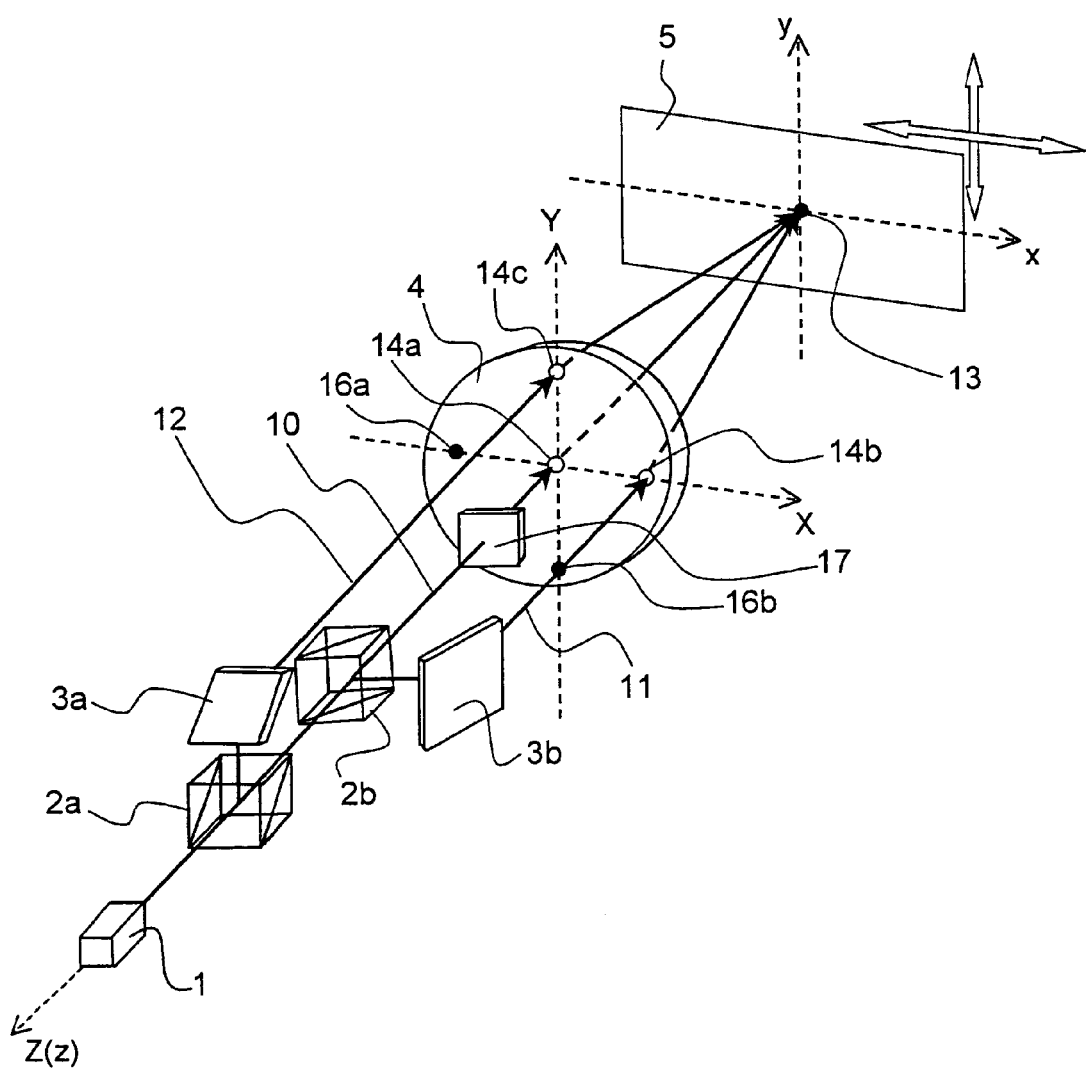
FIG. 10 is a schematic view showing the configuration of an irradiation system of the LDV in Embodiment 3 of the present invention.
Figure 11:
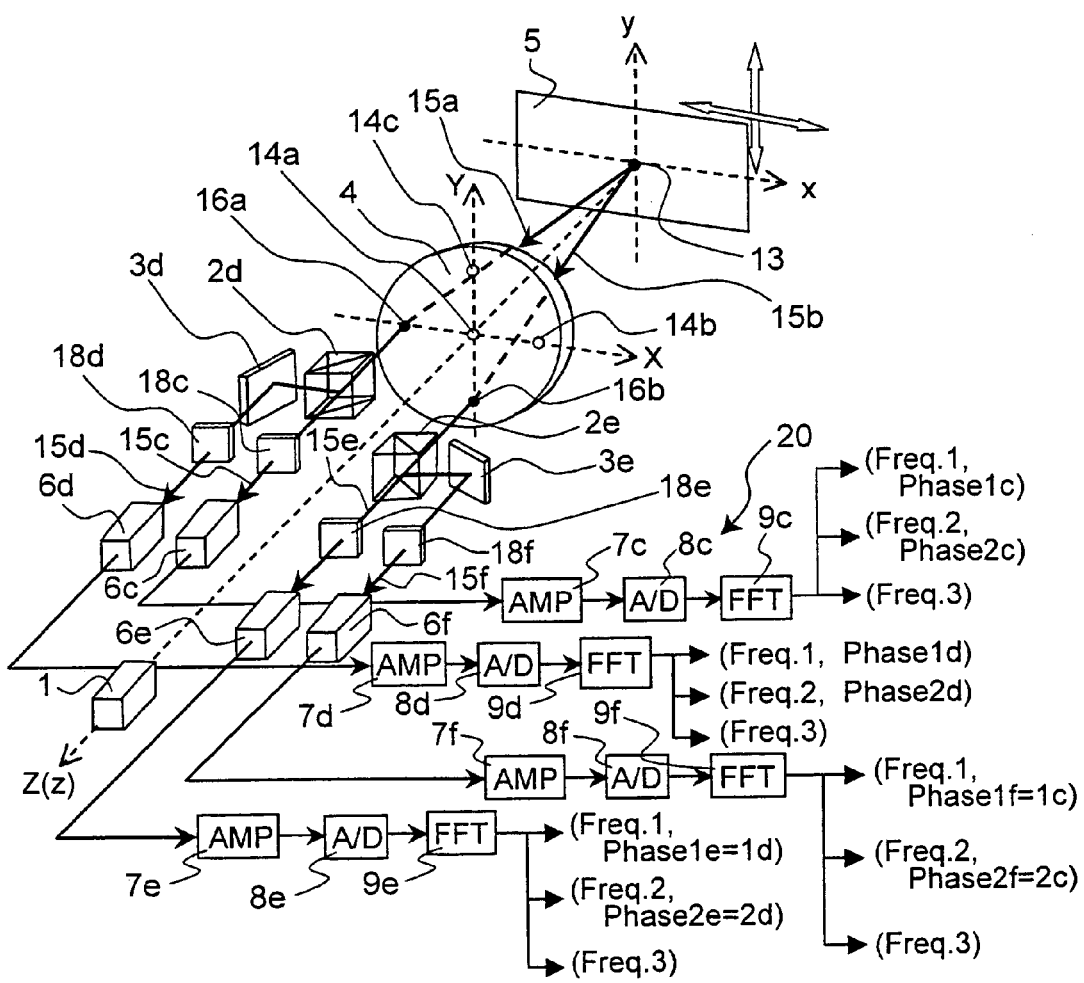
FIG. 11 is a schematic view showing the configuration of a light receiving system of the LDV in Embodiment 3 of the present invention.
Figure 12:
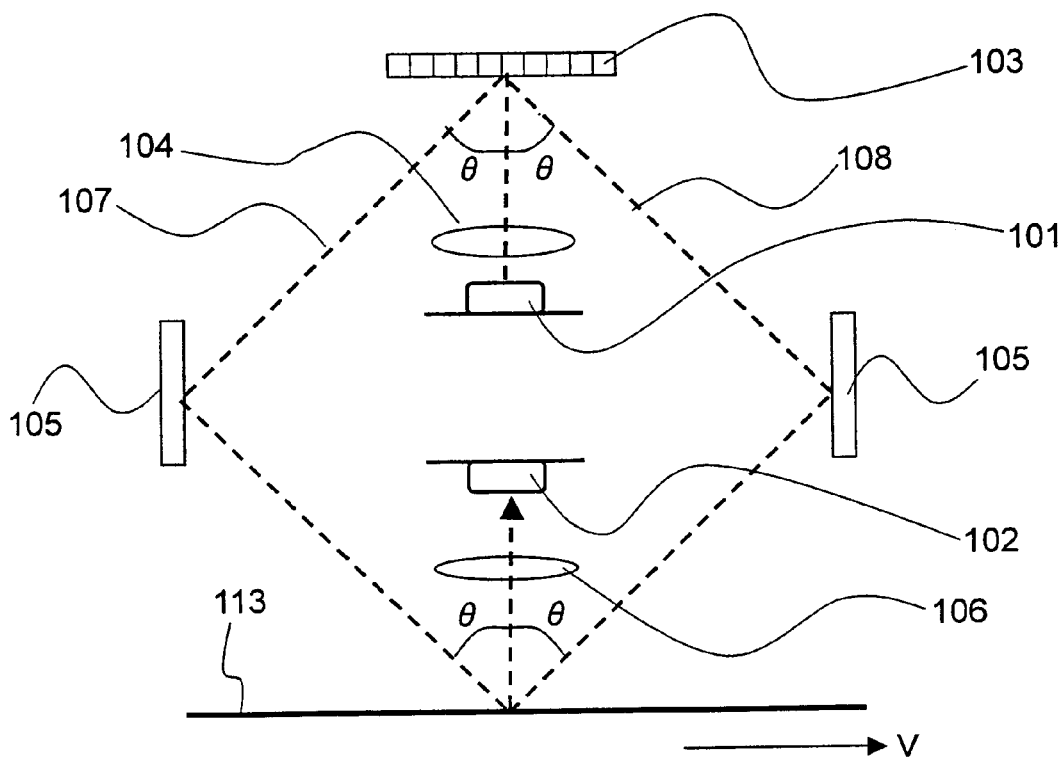
FIG. 12 is a schematic view showing the configuration of a main part of a conventional LDV.
Figure 13:
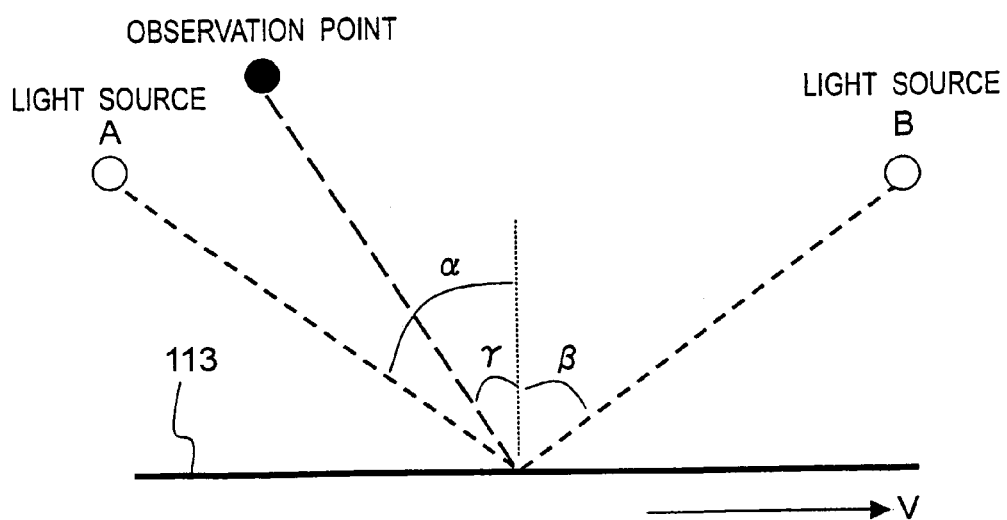
FIG. 13 is an explanatory view for explaining equations that connect the moving velocity of an object to be measured with the Doppler shift frequency.
Figure 14:
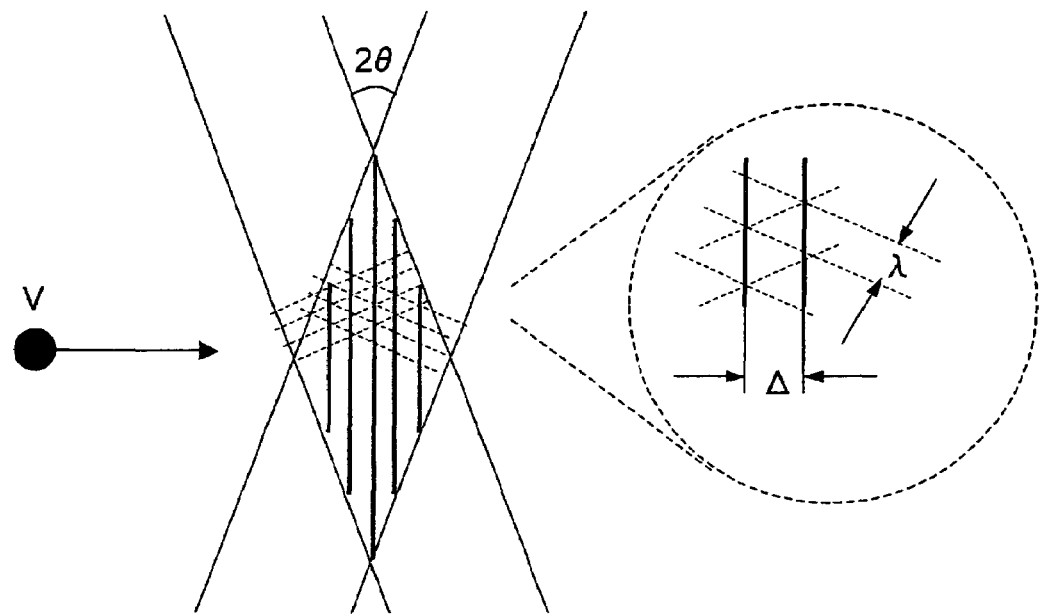
FIG. 14 is an enlarged view showing beams overlapping in the vicinity of a detection point in the conventional LDV.
Figure 15:
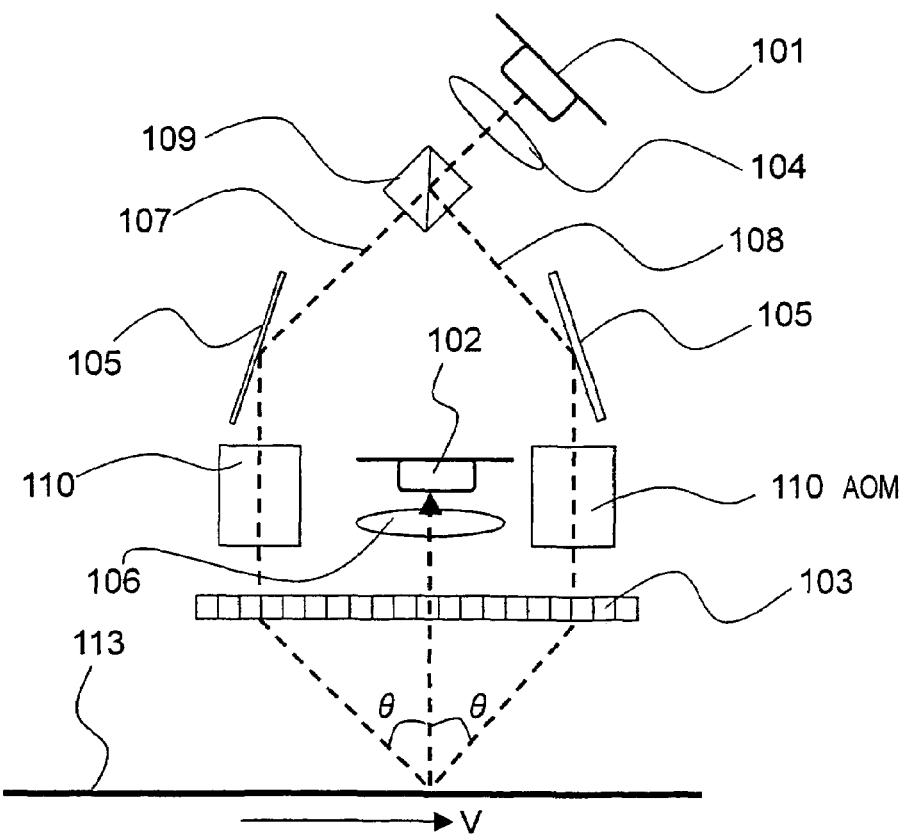
FIG. 15 is a schematic view showing the configuration of a main part of another conventional LDV.
Figure 16:
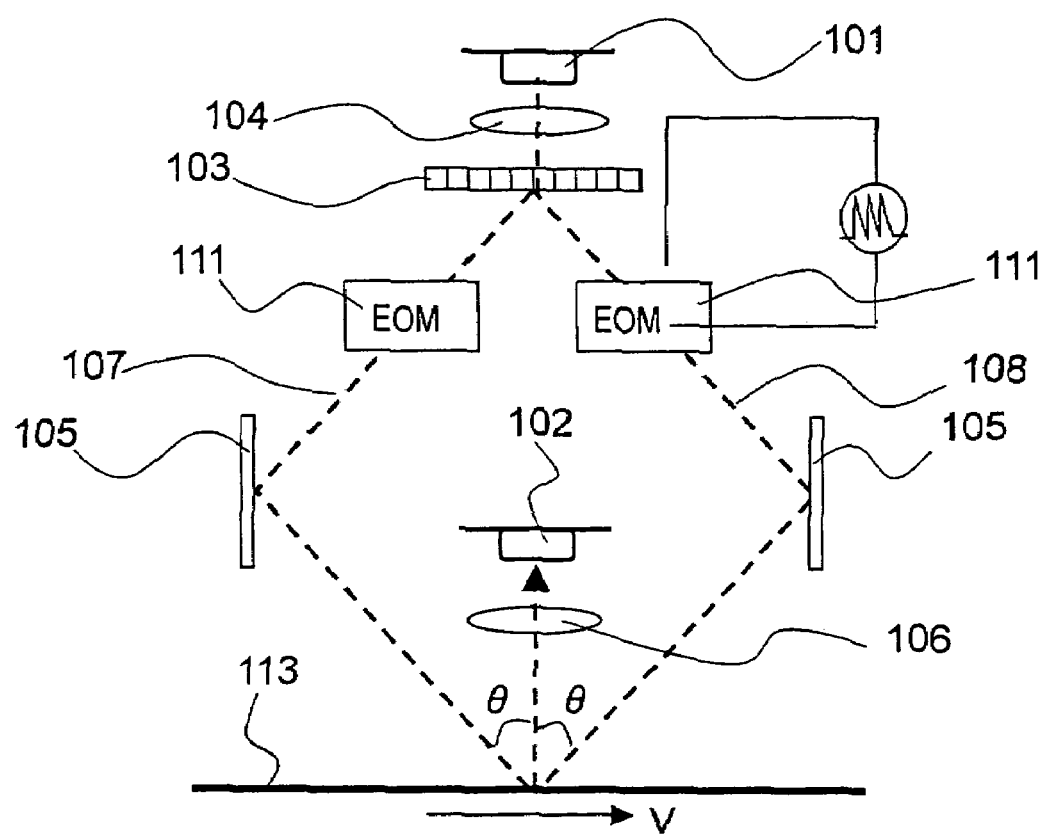
FIG. 16 is a schematic view showing the configuration of a main part of still another conventional LDV.

FIG. 10 is a schematic view showing the configuration of an irradiation system of the LDV in Embodiment 3 of the present invention, and FIG. 11 is a schematic view showing the configuration of a light receiving system of the LDV. In FIGS. 10 and 11, only main component parts such as optical components are illustrated and components for holding the optical components and other components are omitted. The detecting section 21 is also omitted from FIG. 10. Arrowed broken lines in FIGS. 10 and 11 represent coordinate axes. It is to be noted that in FIGS. 10 and 11, X axis and x axis are parallel, Y axis and y axis are parallel, and Z axis and z axis are identical. Moreover, component parts in FIGS. 10 and 11 identical to the component parts of Embodiment 2 shown in FIG. 8 are designated by the reference numerals identical to those of the component parts in FIG. 8 and description thereof is omitted. Further in FIGS. 10 and 11, component parts identical to the component parts of Embodiment 3 shown in FIG. 9 are also designated by the reference numerals identical to those of the component parts in FIG. 9 and description thereof is omitted.

The LDV includes component parts of the irradiation system in FIG. 10 and component parts of the light receiving system in FIG. 11. More particularly, the LDV has the combined structures of Embodiment 2 and Embodiment 3. In the irradiation system of the LDV, as shown in FIG. 10, a quarter-wavelength plate 17 is disposed in the path of the first beam 10 as in Embodiment 2. Further, in the light receiving system of the LDV, as shown in FIG. 11, beat signals 15a, 15b exemplifying the first and second light signals are used as with Embodiment 3. Further in the light receiving system of the LDV, the beat signals 15a, 15b are each split into two beams as with Embodiment 2.

The beat signal 15a is split by a BS 2d exemplifying the third beam splitting device into a beat signal 15c as an example of the fourth light signal and a beat signal 15d as an example of the fourth light signal. The beat signal 15c enters a PD 6c exemplifying the third light detecting device via a third linear polarizer 18c. The beat signal 15d, after its traveling direction is changed by a mirror 3d, enters a PD 6d exemplifying the fourth light detecting device through a fourth linear polarizer 18d.

The beat signal 15b is split by a BS 2e exemplifying the fourth beam splitting device into a beat signal 15e as an example of the fifth light signal and a beat signal 15f as an example of the sixth light signal. The beat signal 15e enters a PD 6e exemplifying the fifth light detecting device via a fifth linear polarizer 18e. The beat signal 15f, after its traveling direction is changed by a mirror 3e, enters a PD 6f exemplifying the sixth light detecting device via a sixth linear polarizer 18f.

The beat signals 15c, 15d, 15e, 15f received in the PDs 6c, 6d, 6e, 6f pass amplifiers 7c, 7d, 7e, 7f and A/D converters 8c, 8d, 8e, 8f in the signal processing circuit in sequence, and then go into FFT computing units 9c, 9d, 9e, 9f. Frequencies and phases of the beat signals 15c, 15d, 15e, and 15f are detected by the FFT computing units 9c, 9d, 9e, and 9f.

It is to be noted that the orientations of optical axes of the quarter-wavelength plate 17, the third linear polarizer 18c, the fourth linear polarizer 18d, the fifth linear polarizer 18e, and the sixth linear polarizer 18f are identical to those in Embodiment 2.

The above-structured LDV has two characteristics: detection of the moving direction of the object 5 using phase difference of the beam signals as shown in Embodiment 2; and determination of the peaks of the x axis component and the y axis component in the FFT spectrum as shown in Embodiment 3. Therefore, information about the moving velocity V and the moving direction of the object 5 on the x-y plane is detectable for 360° or all directions.

The present embodiment is effective for detecting arbitrary two-dimensional movement information about the measuring object on the x-y plane as stated above.

In all the embodiments from Embodiment 1 to Embodiment 4, when the peak frequency of the beat signal in the FFT spectrum is equal to or lower than the threshold value, it is determined that the measured object is in resting state. Taking the FFT spectrum of FIG. 2 as an example, because a peak of 400 Hz or lower in the spectrum is noise, the threshold value is set at 400 Hz, for example, and the peak of 400 Hz or lower in the spectrum is removed. Consequently, three peaks are left in the spectrum, and the effects described in each embodiment can be achieved.

Further, in all the embodiments, there is provided a criterion, that is, if the number of occurrences of output from the A/D converter having a value equal to or larger than a threshold value is equal to or lower than n (n: natural number excluding 0) within a given sampling time, then the measured object is determined to be in resting state. As for the signal from the PD, its DC component is filtered off by, for example, an HPF (High Pass Filter) of the amplifier, so that an ideal value of the signal intensity in resting state is 0, and when the object under observation moves, a sine wave output is generated. By setting the determination criterion as shown above, it becomes possible to prevent erroneous determination due to noise that the object is in moving state even, when the object is in resting state in actuality.

Further, in all the embodiments, the LDV is arranged such that when the number of occurrences of output from the A/D converter having a value equal to or larger than a threshold value is equal to or lower than n within a given sampling time, the FFT computing unit starts being operated.

Generally, the amplitude of a signal outputted while the object is moving is sufficiently larger than the amplitude of noise. When a count (i.e., the number of occurrences) of a digitally converted value equal to or above a certain threshold value of the beat signal from the object to be measured is N (N: natural number excluding 0) or lower, then the beat signal is determined to be noise and the measuring object is detected as being in resting state, whereas when the count exceeds N, then the object is determined to be placed in moving state and the FFT computation is started. This makes it possible to diminish probability of occurrence of error or malfunction due to noise.

Further, in all the embodiments from Embodiment 1 to Embodiment 4, by setting a determination criterion such that if the peak intensity of the beat signal in the FFT spectrum is equal to or lower than a certain threshold value, it is detected that the object 5 is in resting state, it becomes possible to prevent detection error of the movement information on the measured object caused by the peaks created by noise in the FFT spectrum.

Further, in Embodiment 2 and Embodiment 4, a specified range of threshold values is given to the phase difference and determination of the plus/minus sign is made within this range, so that if the phase difference is out of the range, then the object 5 is determined to be in resting state. This makes it possible to diminish moving amount error caused by operation failure.

Further, the LDV in all the embodiments are for detecting the moving velocity of the measuring object, and by taking in the time information in the signal processing in the later stage, velocity information can be easily converted to displacement magnitude. For example, in popularized electronic equipment, this technique can be applied to displacement gauges for detecting the paper feed amount in printers and copiers. Further, the LDVs can detect the velocity from reflected light from a moving object to be measured and additional processing of the moving object (measuring object) is not necessary, which makes the LDVs suitable for application to high-resolution encoders. Moreover, while widely prevalent optical mice detect the moving amount by recognizing movement information on speckle patterns of a detection surface as an image by CCDs (Charge Coupled Devices) and the like, the LDV of the invention can be used in pointing devices such as optical mice. Use of the LDV particularly makes it possible to structure extremely small-size pointing devices, so that the LDV is suitable for use in pointing devices for portable terminal devices such as PDAs (Personal Digital Assistants).

Further, in Embodiments 2 to 4, a plurality of beat signals are received and therefore the same number of PDs as that of the beat signals are disposed. Alternatively, one light detecting device having the same number of light receiving faces as that of the beat signals may be disposed.

The present invention is applicable to LDVs which apply coherent light to a moving object to be measured, receives diffused light from the object, and obtains the moving velocity of the object based on the frequency shift of the light corresponding to the moving velocity of the measuring object.

Further, if the present invention is applied to small-size LDVs, two-dimensional moving velocity and moving direction of an object to be measured can be detected from received signals.

Further, the present invention is also applicable to simplified LDVs which are small in size and low in power consumption so as to be applicable to consumer-oriented equipment and which are capable of detecting two-dimensional moving velocity and moving direction.

It is to be noted that according to the present invention, the light emitted from the semiconductor light-emitting device may be split by the first beam splitting device into four or more beams, but that the light emitted from the semiconductor light-emitting device should preferably be split by the first beam splitting device into three beams in view of preventing complication of the optical system.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical movement information detector, comprising:
   a semiconductor light-emitting device for emitting coherent light;
   a first beam splitting device for splitting the light emitted from the semiconductor light-emitting device into at least three beams;
   an optical system for forming one spot on a surface of an object to be measured with use of the beams;
   a light detecting device for receiving diffused light coming from the spot;
   a signal processing circuit for processing a signal outputted from the light detecting device; and
   a detecting section for obtaining movement information on the object based on an output from the signal processing circuit; wherein
   the signal processing circuit includes:
      an analog-digital converting section for converting an analog signal outputted from the light detecting device to a digital signal; and
      a Fourier transforming section for performing Fourier transform upon the digital signal, and
   the detecting section obtains the moving information on the object based on three peak frequencies in a spectrum obtained by the Fourier transforming section, said three peak frequencies being attributable to a moving velocity of the object.

2. The optical movement information detector as defined in claim 1, wherein the first beam splitting device splits the light emitted from the semiconductor light-emitting device into three beams which are a first beam, a second beam and a third beam, and a first plane including the first beam and the second beam is perpendicular to a second plane including the first beam and the third beam.

3. The optical movement information detector as defined in claim 2, wherein the optical system includes a light condensing section for collecting the first beam, the second beam and the third beam into the spot, the first beam enters an original point that is a point of intersection of a third plane on which the light condensing section is disposed, the first plane and the second plane, the second beam enters a first incident point on an X axis that is a line of intersection of the third plane with the first plane, the third beam enters a second incident point on a Y axis that is a line of intersection of the third plane with the second plane, points of intersection of each of the first beam, the second beam and the third beam with the third plane form a right angled triangle, the right angled triangle is included in a first quadrant with respect to the X axis and Y axis, and the diffused light passes a third quadrant with respect to the X axis and the Y axis.

4. The optical movement information detector as defined in claim 3, wherein a bisector of an angle formed by the X axis and the Y axis that extends from the first quadrant to the third quadrant intersects with an optical axis of the diffused light.

5. The optical movement information detector as defined in claim 3, wherein the light condensing section comprises a condenser lens.

6. The optical movement information detector as defined in claim 2, wherein the Fourier transforming section obtains a first peak frequency, a second peak frequency lower than the first peak frequency, and a third peak frequency lower than the first and second peak frequencies, and the detecting section obtains a moving velocity of the object by calculating a sum of squares of the second peak frequency and the third frequency without using the first peak frequency.

7. The optical movement information detector as defined in claim 2, wherein the Fourier transforming section obtains a first peak frequency, a second peak frequency lower than the first peak frequency, and a third peak frequency lower than the first and second peak frequencies, and the detecting section obtains a moving velocity of the object by calculating a sum of squares of the first peak frequency and the third frequency without using the second peak frequency.

8. The optical movement information detector as defined in claim 2, wherein the Fourier transforming section obtains a first peak frequency and a second peak frequency lower than the first peak frequency, and the detecting section obtains a moving velocity of the object by using the second peak frequency without using the first peak frequency.

9. The optical movement information detector as defined in claim 2, wherein the Fourier transforming section obtains first and second peak frequencies, and the detecting section obtains a moving direction of the object from a ratio between the first peak frequency and the second peak frequency.

10. The optical movement information detector as defined in claim 1, wherein the first beam splitting device splits the light emitted from the semiconductor light-emitting device into three beams which are a first beam, a second beam and a third beam, the optical movement information detector comprising:

a wavelength plate that is disposed on an optical axis of the first beam and forms an angle of 45° with a polarization direction of the first beam;

the optical system forming the one spot on the surface of the measuring object by using the first beam, the second beam and the third beam;

a second beam splitting device for splitting the diffused light coming from the spot into first and second light signals;

a first linear polarizer disposed on an optical axis of the first light signal; and a second linear polarizer disposed on an axis of the second light signal and having an optical axis approximately orthogonal to an optical axis of the first linear polarizer, wherein the light detecting device includes a first light detecting device for receiving the first light signal and a second light detecting device for receiving the second light signal, and the detecting section obtains:

a moving velocity of the object based on at least either the peak frequency regarding the first light signal or the peak frequency regarding the second light signal; and a moving direction of the object based on a phase regarding the first light signal and a phase regarding the second light signal.

11. The optical movement information detector as defined in claim 10, wherein the Fourier transforming section obtains a fourth peak frequency, a fifth peak frequency and a sixth peak frequency regarding the first light signal, and also obtains a seventh peak frequency, an eighth peak frequency and a ninth peak frequency regarding the second light signal, and the detecting section obtains a moving direction of the object from a phase difference between a signal corresponding to the forth peak frequency and a signal corresponding to the seventh peak frequency, as well as a phase difference between a signal corresponding to the fifth peak frequency and a signal corresponding to the eighth peak frequency.

12. The optical movement information detector as defined in claim 11, wherein the Fourier transforming section obtains real parts and imaginary parts for each of the fourth peak frequency, the fifth peak frequency, the seventh peak frequency and the eighth peak frequency, and phases of signals corresponding to each of the fourth peak frequency, the fifth peak frequency, the seventh peak frequency and the eighth peak frequency are obtained based on the real parts and the imaginary parts.

13. The optical movement information detector as defined in claim 11 or 12, wherein the detecting section detects the moving direction of the object based on whether the phase difference is positive or negative.

14. The optical movement information detector as defined in claim 11 or 12, wherein the detecting section determines that the measuring object is in resting state if a value of the phase difference is out of a specified range.

15. The optical movement information detector as defined in claim 1, wherein the first beam splitting device splits the light emitted from the semiconductor light-emitting device into three beams which are a first beam, a second beam and a third beam;

a first plane including the first beam and the second beam is perpendicular to a second plane including the first beam and the third beam, the optical system includes a light condensing section for collecting the first beam, the second beam and the third beam into the spot, the first beam enters an original point that is a point of intersection of a third plane on which the light condensing section is disposed, the first plane and the second plane, the second beam enters a first incident point on an X axis that is a line of intersection of the third plane with the first plane, the third beam enters a second incident point on a Y axis that is a line of intersection of the third plane with the second plane, the diffused light includes a first light signal having an optical axis passing a point symmetrical about the original point to the first incident point, and a second light signal having an optical axis passing a point symmetrical about the original point to the second incident point, and the light detecting device includes a first light detecting device for receiving the first light signal and a second light detecting device for receiving the second light signal.

16. The optical movement information detector as defined in claim 15, wherein the Fourier transforming section obtains a plurality of peak frequencies regarding the first light signal and also obtains a plurality of peak frequencies regarding the second light signal, and the detecting section obtains a moving velocity of the object by calculating a sum of squares of a maximum peak frequency among the plurality of peak frequencies regarding the first light signal and a maximum peak frequency among the plurality of peak frequencies regarding the second light signal.

17. The optical movement information detector as defined in claim 16, wherein the detecting section detects a moving direction of the object from a ratio of the maximum peak frequency among the plurality of peak frequencies regarding the first light signal and the maximum peak frequency among the plurality of peak frequencies regarding the second light signal.

18. The optical movement information detector as defined in claim 15, further comprising:

a third beam splitting device for splitting the first light signal into two light signals which are a third light signal and a fourth light signal;

a fourth beam splitting device for splitting the second light signal into two light signals which are a fifth light signal and a sixth light signal;

a third linear polarizer disposed on an optical axis of the third light signal;

a fourth linear polarizer disposed on an optical axis of the fourth light signal and having an optical axis approximately orthogonal to an optical axis of the third linear polarizer;

a fifth linear polarizer disposed on an optical axis of the fifth light signal; and a sixth linear polarizer disposed on an optical axis of the sixth light signal and having an optical axis approximately orthogonal to an optical axis of the fifth linear polarizer, wherein the first light detecting device includes a third light detecting device for receiving the third light signal and a fourth light detecting device for receiving the fourth light signal, and the second light detecting device includes a fifth light detecting device for receiving the fifth light signal and a sixth light detecting device for receiving the sixth light signal.

19. The optical movement information detector as defined in claim 1, wherein the detecting section determines that the object is in resting state if a value of peak intensity of the spectrum is equal to or lower than a specified threshold value.

20. The optical movement information detector as defined in claim 1, wherein the detecting section determines that the object is in resting state if a count of events within a given sampling time that the digital signal has an output value equal to or larger than a threshold value is n (n: natural number excluding 0) or less.

21. The optical movement information detector as defined in claim 1, wherein calculation by the Fourier transforming section starts when a count of events within a given sampling time that the digital signal has an output value equal to or larger than a threshold value exceeds n (n: natural number excluding 0).

22. The optical movement information detector as defined in claim 1, wherein the detecting section determines that the object is in resting state if a value of a maximum peak intensity of the spectrum is equal to or lower than N (N: natural number excluding 0).

23. Electronic equipment having an optical movement information detector, wherein the optical movement information detector comprises:

a semiconductor light-emitting device for emitting coherent light;

a first beam splitting device for splitting the light emitted from the semiconductor light-emitting device into at least three beams;

an optical system for forming one spot on a surface of an object to be measured with use of the beams;

a light detecting device for receiving diffused light coming from the spot;

a signal processing circuit for processing a signal outputted from the light detecting device; and a detecting section for obtaining movement information on the object based on an output from the signal processing circuit; wherein the signal processing circuit includes:
- an analog-digital converting section for converting an analog signal outputted from the light detecting device to a digital signal; and
- a Fourier transforming section for performing Fourier transform upon the digital signal, and the detecting section obtains the moving information on the object based on three peak frequencies in a spectrum obtained by the Fourier transforming section, said three peak frequencies being attributable to a moving velocity of the object.

24. The electronic equipment as defined in claim 23, which is a pointing device.

25. The electronic equipment as defined in claim 23, which is an encoder.

* * * * *